United States Patent
Maharshi et al.

(10) Patent No.: US 12,135,418 B2
(45) Date of Patent: *Nov. 5, 2024

(54) METHODS AND APPARATUS FOR CAPTURING AND USING IMAGES IN A SYSTEM INCLUDING WIPERS

(71) Applicant: Deere & Company, Moline, IL (US)

(72) Inventors: Atul Maharshi, South Orange, NJ (US); Pablo A Anigstein, Palo Alto, CA (US); Rajiv Laroia, Far Hills, NJ (US)

(73) Assignee: Deere & Company, Moline, IL (US)

( * ) Notice: Subject to any disclaimer, the term of this patent is extended or adjusted under 35 U.S.C. 154(b) by 225 days.

This patent is subject to a terminal disclaimer.

(21) Appl. No.: 17/532,910

(22) Filed: Nov. 22, 2021

(65) Prior Publication Data
US 2022/0080925 A1  Mar. 17, 2022

Related U.S. Application Data

(63) Continuation of application No. 16/711,363, filed on Dec. 11, 2019, now Pat. No. 11,180,117.
(Continued)

(51) Int. Cl.
*G02B 27/00* (2006.01)
*B60R 11/00* (2006.01)
(Continued)

(52) U.S. Cl.
CPC .......... *G02B 27/0006* (2013.01); *B60R 11/04* (2013.01); *B60S 1/0848* (2013.01);
(Continued)

(58) Field of Classification Search
None
See application file for complete search history.

(56) References Cited

U.S. PATENT DOCUMENTS

2018/0012085 A1 * 1/2018 Blayvas ............... G06V 20/58
2019/0095761 A1 * 3/2019 Terada ................. G06T 7/97

FOREIGN PATENT DOCUMENTS

| JP | H0858529 A | * 3/1994 |
| JP | 1996-058529 A | 3/1996 |
| JP | 2015-088047 A | 5/2015 |

OTHER PUBLICATIONS

Extended European Search Report and Written Opinion issued in European Patent Application No. 20857787.4, dated Oct. 11, 2023, in 10 pages.

* cited by examiner

*Primary Examiner* — Jaime Figueroa
*Assistant Examiner* — Atticus A Cameron
(74) *Attorney, Agent, or Firm* — Straub & Straub; Michael P. Straub; Stephen T. Straub

(57) ABSTRACT

A wiper is controlled to sweep a surface area, e.g., a portion of a windshield, in front of a camera, e.g., a camera mounted inside a vehicle. An image captured from the camera after the wiper completes, e.g., immediately completes, the sweep of the surface area in front of the camera is used in generating a depth map. In some embodiments a first wiper is controlled to clear a surface area in front of a first camera while a second wiper is controlled to clear a surface area in front of second camera at the same time, and the first and second cameras are synchronized to initiate image capture at the same time, capturing images through recently cleared area, and the captured images are used to generate a depth map. A vehicle control operation, e.g., a direction, braking or speed control operation is performed based on the depth map.

28 Claims, 19 Drawing Sheets

Related U.S. Application Data

(60) Provisional application No. 62/894,785, filed on Aug. 31, 2019.

(51) Int. Cl.
| | | |
|---|---|---|
| *B60R 11/04* | (2006.01) | |
| *B60S 1/08* | (2006.01) | |
| *G06V 10/147* | (2022.01) | |
| *G06V 20/56* | (2022.01) | |

(52) U.S. Cl.
CPC ............ *G06V 10/147* (2022.01); *G06V 20/56* (2022.01); *B60R 2011/0026* (2013.01)

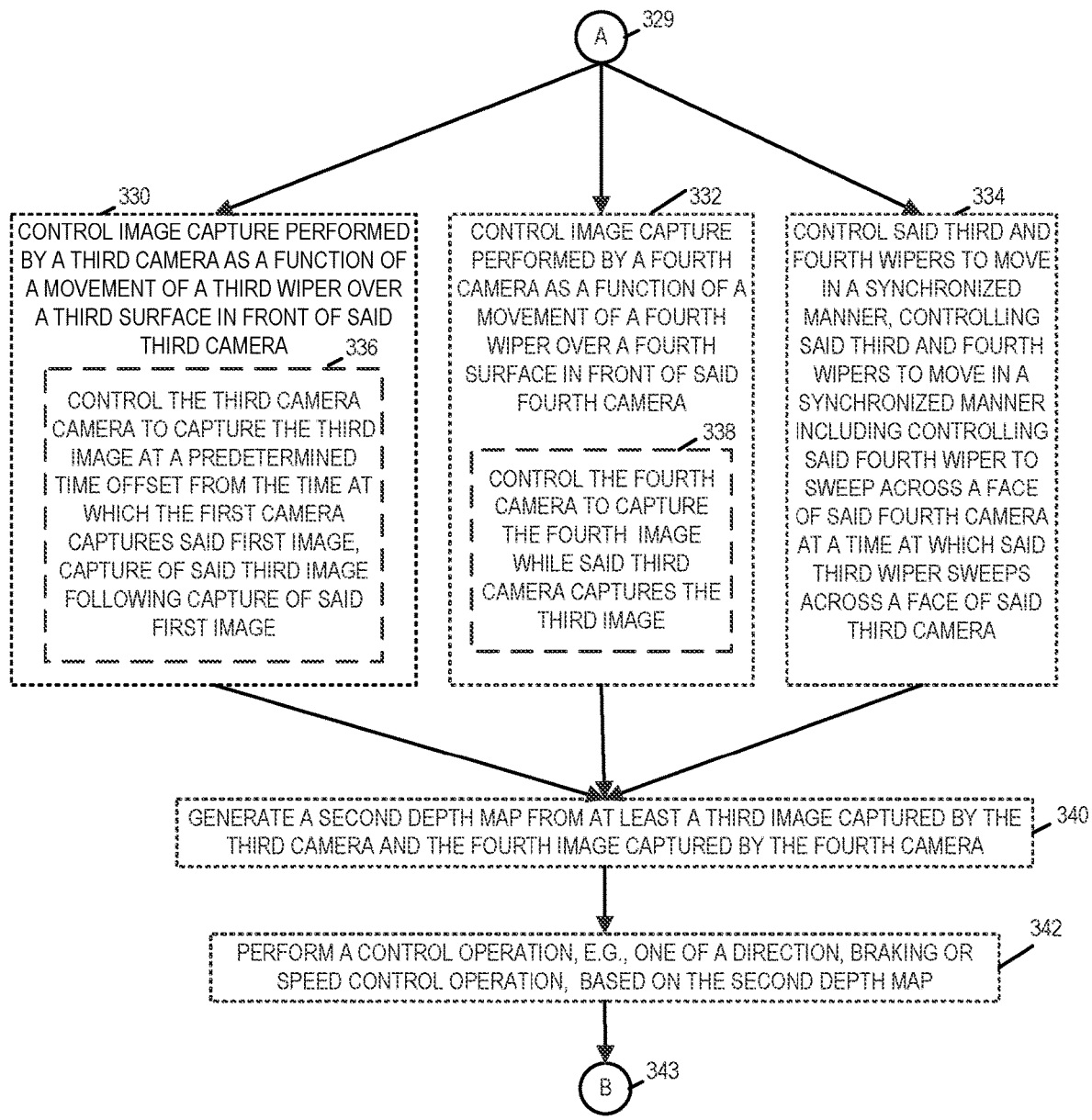

1205

ASSEMBLY OF COMPONENTS (PART C)

COMPONENT CONFIGURED TO CONTROL A FIRST WIPER TO SWEEP A FIRST SURFACE IN FRONT OF A FIRST CAMERA, SAID FIRST SURFACE CORRESPONDING TO A FIRST APERTURE THOUGH WHICH LIGHT ENTERS THE FIRST CAMERA — 1404

COMPONENT CONFIGURED TO CONTROL THE FIRST CAMERA TO CAPTURE A FIRST IMAGE AFTER THE FIRST WIPER SWEEPS THE FIRST SURFACE IN FRONT OF THE FIRST CAMERA — 1406

COMPONENT CONFIGURED TO CONTROL THE FIRST WIPER TO SWEEP A SECOND SURFACE IN FRONT OF A SECOND CAMERA, SAID SECOND SURFACE CORRESPONDING TO A SECOND APERTURE THOUGH WHICH LIGHT ENTERS THE SECOND CAMERA — 1408

COMPONENT CONFIGURED TO CONTROL THE SECOND CAMERA TO INITIATE CAPTURE OF A SECOND IMAGE AFTER THE FIRST WIPER SWEEPS THE SECOND SURFACE IN FRONT OF SAID SECOND CAMERA, CAPTURE OF THE SECOND IMAGE BEING INITIATED AFTER CAPTURE OF THE FIRST IMAGE BY THE FIRST CAMERA IS INITIATED — 1410

COMPONENT CONFIGURED TO CONTROL THE FIRST WIPER TO SWEEP A THIRD SURFACE IN FRONT OF A THIRD CAMERA, SAID THIRD SURFACE CORRESPONDING TO A THIRD APERTURE THOUGH WHICH LIGHT ENTERS THE THIRD CAMERA — 1412

COMPONENT CONFIGURED TO CONTROL THE THIRD CAMERA TO INITIATE CAPTURE OF A THIRD IMAGE AFTER THE FIRST WIPER SWEEPS A THIRD SURFACE IN FRONT OF SAID THIRD CAMERA, CAPTURE OF THE THIRD IMAGE BEING INITIATED AFTER CAPTURE OF THE SECOND IMAGE BY THE SECOND CAMERA IS INITIATED — 1414

COMPONENT CONFIGURED TO GENERATE A FIRST DEPTH MAP FROM AT LEAST THE FIRST IMAGE CAPTURED BY THE FIRST CAMERA AND THE SECOND IMAGE CAPTURED BY THE SECOND CAMERA — 1416

COMPONENT CONFIGURED TO GIVE GREATER WEIGHT TO CONTENT IN SAID FIRST IMAGE THAN CONTENT IN SAID SECOND IMAGE WHEN GENERATING THE FIRST DEPTH MAP — 1418

COMPONENT CONFIGURED TO GENERATE SAID FIRST DEPTH MAP FROM THE FIRST IMAGE CAPTURED BY THE FIRST CAMERA, THE SECOND IMAGE CAPTURED BY THE SECOND CAMERA AND THE THIRD IMAGE CAPTURED BY THE THIRD CAMERA — 1420

COMPONENT CONFIGURED TO GIVE GREATER WEIGHT TO CONTENT IN SAID FIRST IMAGE THAN CONTENT IN SAID SECOND IMAGE, AND GIVE GREATER WEIGHT TO CONTENT IN SAID SECOND IMAGE THAN CONTENT IN SAID THIRD IMAGE WHEN GENERATING THE FIRST DEPTH MAP — 1422

COMPONENT CONFIGURED TO PERFORM A CONTROL OPERATION, E.G., ONE OF A DIRECTION, BRAKING OR SPEED CONTROL OPERATION, BASED ON THE FIRST DEPTH MAP — 1424

FIGURE 12C

| FIGURE 12A | FIGURE 12B | FIGURE 12C |

FIGURE 12

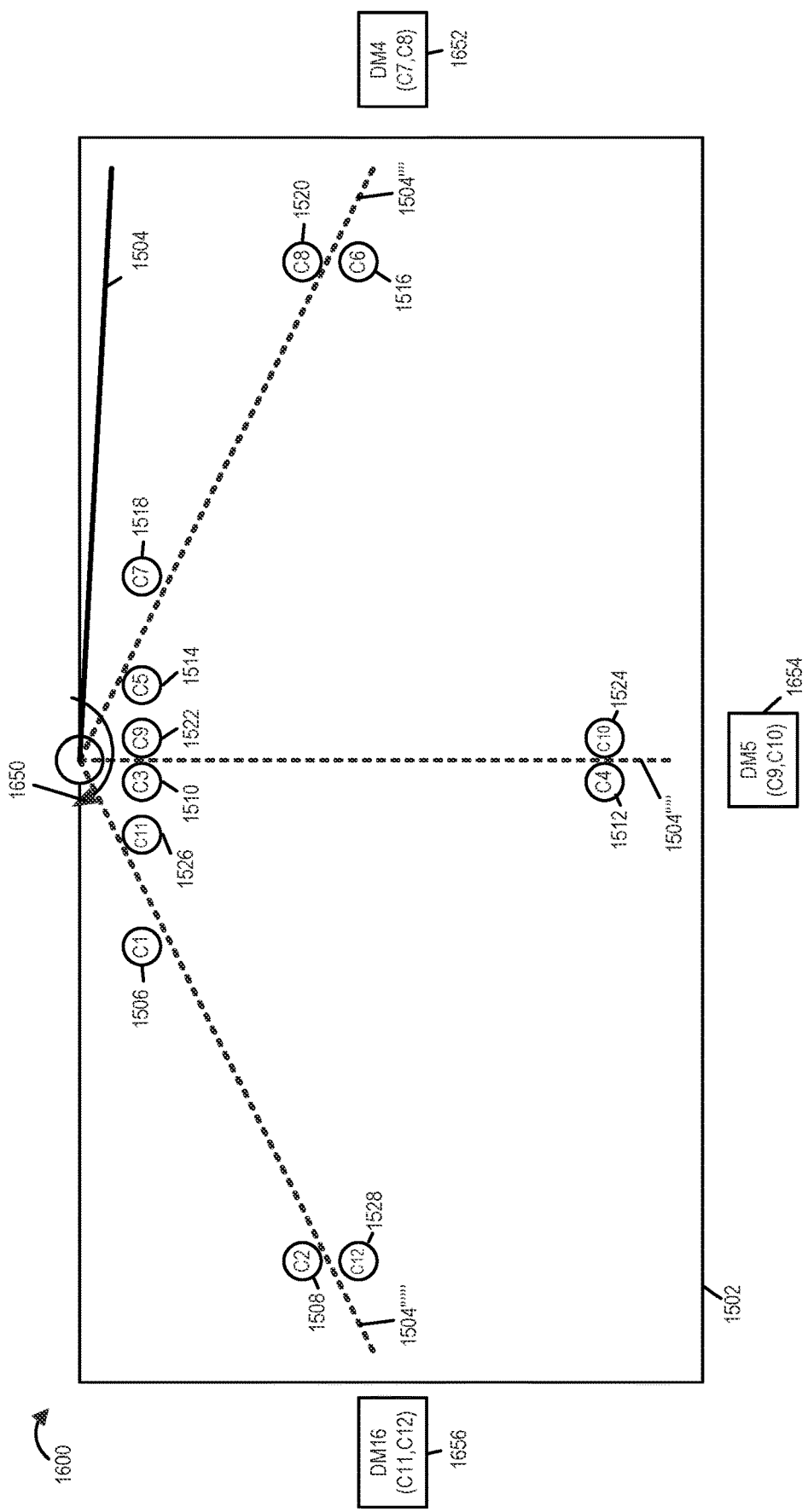

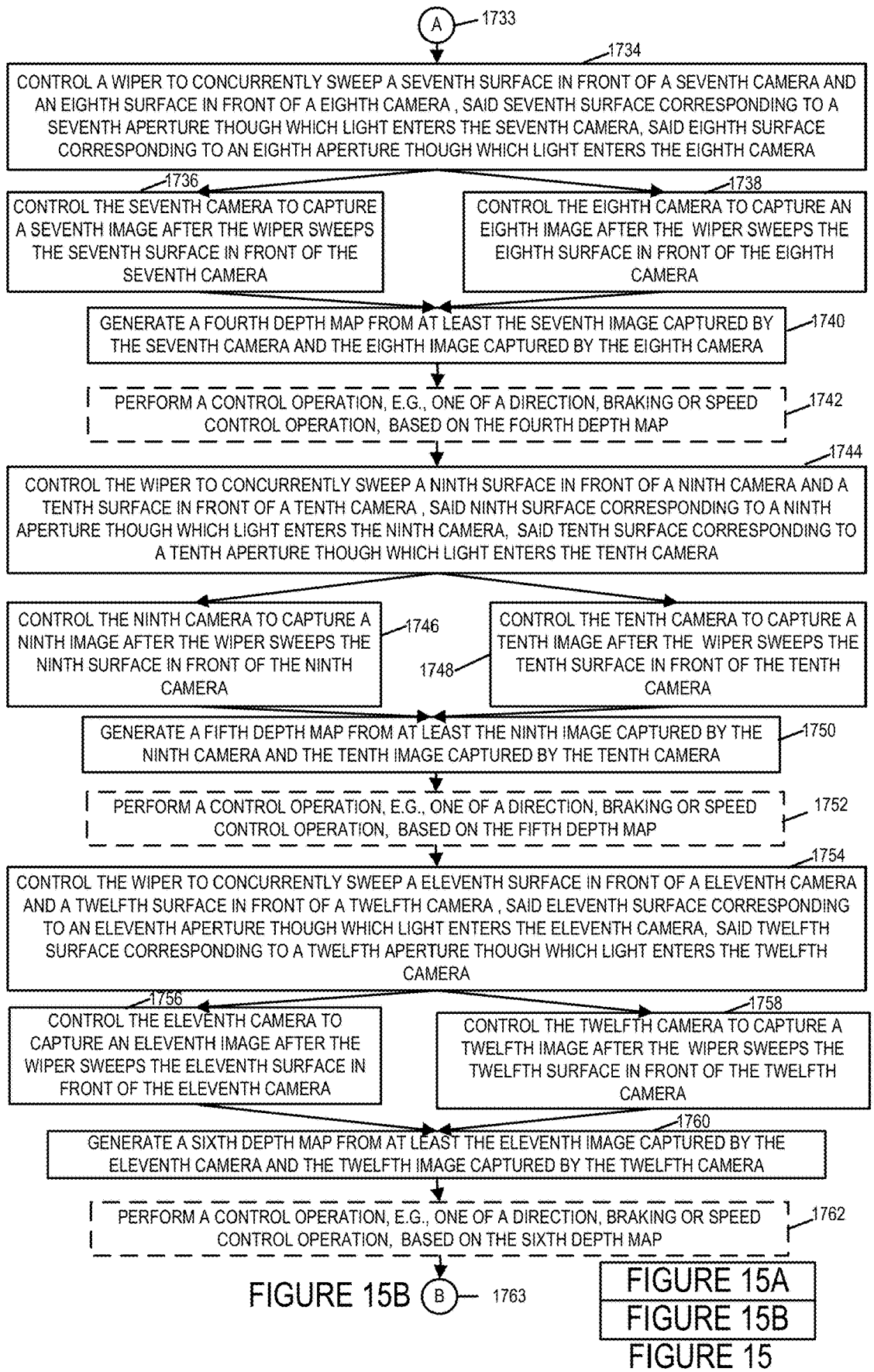

METHODS AND APPARATUS FOR CAPTURING AND USING IMAGES IN A SYSTEM INCLUDING WIPERS

RELATED APPLICATIONS

The present application claims the benefit of U.S. patent application Ser. No. 16/711,363 filed Dec. 11, 2019, which published as US 2021-0061228 A1 on Mar. 4, 2021, which claims benefit of U.S. provisional patent application Ser. No. 62/894,785 filed Aug. 31, 2019 each of which is hereby expressly incorporated by reference in its entirety.

FIELD

The present application relates to camera device methods and apparatus and, more particularly to methods and apparatus for controlling and/or using a system including one or more cameras and at least one wiper.

BACKGROUND

Camera systems are often used to control one or more devices. As automated control of cars and other vehicles continues to grow in interest, the ability to capture visual information and use it to control a vehicle such as a car or another device is of ever growing interest.

Vehicle control often involves controlling the speed and/or position of a vehicle relative to one or more objects around the vehicle, e.g., to avoid impacts with pedestrians, cars and/or other objects. From a vehicle control perspective, it is often desirable to know the distance from the vehicle in which a camera or cameras are located and an object. A depth map is one way of representing the distance between device including one or more cameras and the objects in the field of view of the cameras.

Vehicles are often used outside where cameras may end up having their field of view obstructed by rain, snow or dirt which may build up on a lens, windshield or other surface through which a camera observes the environment. An obstructed camera due to weather or other conditions may render the camera system ineffective in driving conditions where it might be most useful or even worse lead to an accident due to faulty determinations made because of obstructed camera views.

In an attempt to reduce the impact of weather and other environmental conditions, one or more wipers may be, and often are, used on vehicles. By placing cameras in a position where a wiper can clean the surface through which the camera captures images, it is thought that the effect of weather and/or dirt landing on the surface in front of a camera can be reduced or minimized.

Unfortunately the use of wipers introduces the potential for the wiper itself to obscure the field of view as it passes in front of a camera. In addition the quality of an image which is captured will vary depending on the time since the wiper cleared the view of the camera, e.g., as rain, snow or dirt build up on the surface in front of the camera with the visibility deteriorating as a function of time from the last wipe in cases where rain or snow build up on the surface in front of the camera such as during a rain or snow storm. This results in images of differing quality being captured at different times particularly in the case of poor weather conditions.

In many systems which include wipers on the windshield of a car, the wiper control is based on weather or other environmental conditions and is controlled completely independent of camera operation. For example a camera placed behind a windshield of a car normally operates independent of the operation of the windshield wipers. As a result, the quality of captured images may vary depending on whether or not the wipers are operating, the amount of time rain, dirt or snow is allowed to accumulate on a surface in front of a camera and/or various other conditions.

The problems of varying quality of captured images can be particularly troubling in systems where input from multiple different cameras located at different locations on a vehicle are being used to control the vehicle as different cameras may perceive different things even if they are directed to the same portion of an environment because of build up of rain, snow or dirt and the possible passing of a wiper in front of one camera at a different time than the time at which a wiper passes over another camera.

In view of the above, it should be appreciated that there is a need for improved methods of using one or more wipers in combination with one or more cameras. It is desirable if at least some of the methods and/or apparatus synchronize camera and wiper operation and/or take into consideration wiper action or position when using images captured by one or more cameras. While it is desirable that the methods and apparatus be useful in a wide range of applications, it is desirable that at least some of the new and improved methods and apparatus be suited for use in vehicles and/or vehicle control systems.

SUMMARY

Methods and apparatus for using one or more wipers in combination with one but often multiple cameras are described. In various embodiments camera operation is synchronized with wiper operation. Images captured by cameras can be, and sometimes are, processed to generate a depth map. The depth information in the depth map can be, and sometimes is, used to control a device, e.g., a motor vehicle.

In various embodiments first and second cameras are controlled to capture images after a wiper passes over a surface in front of the cameras, e.g., shortly after the wiper passes. In some embodiments separate wipers are positioned in front of the first and second cameras which are spaced apart from one another to facilitate depth determinations from the captured images. In some embodiments the first and second wipers operate in a synchronized manner with both the first and second cameras being triggered to capture images at the same time. The images are compared and processed to generate depth information indicating the distance from the cameras to objects in the environment.

By synchronizing wiper movement and image capture images are captured shortly after the wipers move in front of the first and second cameras making the images captured and used in depth determination likely to be more reliable than in cases where the time from when the wiper moved in front of the camera and the image is taken may be longer, e.g., allowing for rain, snow or dirt buildup before the images are captured. Furthermore by synchronizing image capture with wiper movement care can be taken to avoid capturing images while the wiper is obscuring the camera view and/or images captured when the camera view is obscured can be discarded so that the wiper presence in front of the camera or cameras does not result in faulty distance determinations.

Multiple pairs of cameras are used in some embodiments to allow for multiple image capture time periods with multiple cameras being positioned in a set behind a wiper, e.g., with a left set of cameras and a right set of cameras being positioned behind left and right wipers. The cameras in a set in at least some such embodiments are controlled to capture images sequential with the camera taking an image at a given time following the wiper path so that the camera whose view was cleaned most recently is used to capture in image at a given time.

In single wiper systems where multiple cameras are placed behind a single wiper and multiple images captured by different cameras behind the single wiper are used for a depth determination, the time from which the wiper passed over the area in front of a camera is taken into consideration when making a depth determination. The shorter the time from which the image was taken and the wiper pass in front of the camera the greater the weight given to the image determination. In some such embodiments the multiple cameras are operated in parallel, e.g., at the same time to capture images while in other embodiments they are operated sequentially. In the case where multiple cameras operate in parallel, images which are obstructed by the wiper at a given time are discarded or given significantly lower weight than images from non-obstructed cameras for depth determination purposes. In this way both the probability that an image corresponds to a recently cleaned viewing area or that the image was degraded by the presence of the wiper can and are taken into consideration when making depth determinations.

An exemplary method, in accordance with some embodiments, comprises: controlling a first wiper to sweep a first surface in front of a first camera; controlling the first camera to capture a first image after the first wiper sweeps the first surface in front of the first camera; and generating a first depth map from at least the first image captured by the first camera and a second image captured by a second camera.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 3B is a second part of a flowchart of an exemplary method of operating cameras and wipers in a coordinated manner in accordance with an exemplary embodiment.

FIG. 3 comprises the combination of FIG. 3A and FIG. 3B.

FIG. 12C is a first part of an assembly of components which may be included in a exemplary vehicle in accordance with an exemplary embodiment.

FIG. 12 comprises the combination of FIG. 12A, FIG. 12B and FIG. 12C.

FIG. 14 illustrates a second part an example for an exemplary embodiment in which a single wiper sweeps a windshield, and different sets of cameras, e.g., different pairs of cameras, corresponding to recently cleared windshield portions, are used at different times to capture images used to generate a depth map.

FIG. 15B is a second part of a flowchart of an exemplary method of operating cameras and a wiper in a coordinated manner in accordance with an exemplary embodiment.

FIG. 15 comprises the combination of FIG. 15A and FIG. 15B.

DETAILED DESCRIPTION

Figure 1:
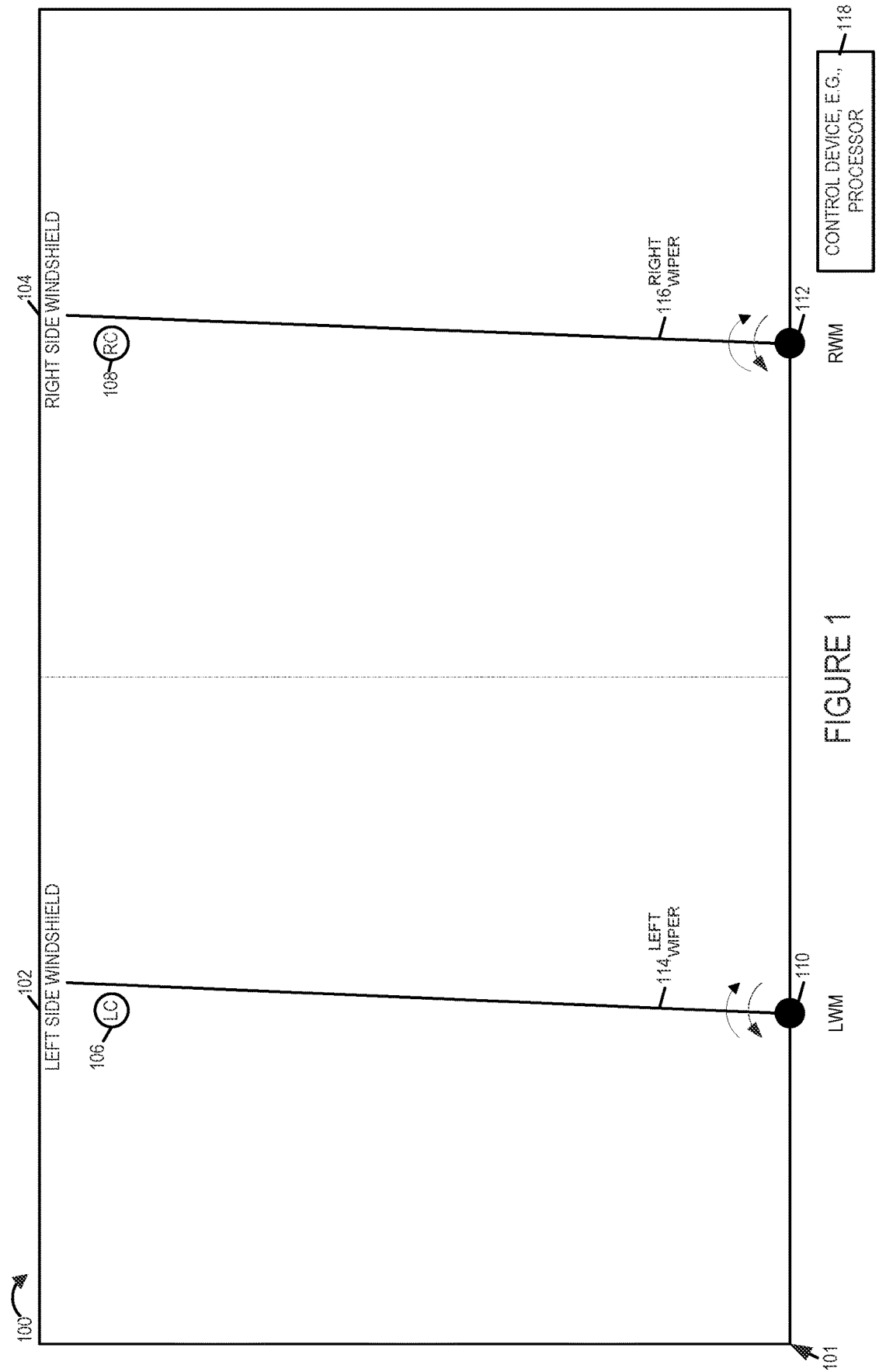
FIG. 1 illustrates exemplary cameras and exemplary wipers, included in a vehicle, wherein wiper motion and camera capture are synchronized in accordance with an exemplary embodiment.

FIG. 1 is a drawing 100 which illustrates exemplary cameras, left camera (LC) 106 and right camera (RC) 108, and exemplary wipers, left wiper 114, right wiper 116, included in an exemplary vehicle implemented in accordance with features of the present invention, wherein wiper motion and camera capture are synchronized in accordance with an exemplary embodiment. Drawing 100 illustrates components included as part of an exemplary vehicle including an exemplary windshield 101 including a left side windshield portion 102 and a right side portion 104, a left camera 106, mounted inside the car behind the left side windshield portion 102, which captures images as viewed through the left side windshield portion 102, a left wiper 114 which sweeps the windshield 101 including sweeping a windshield portion in front of the left camera 106 aperture, a right camera 108, mounted inside the car behind the right side windshield portion 104, which captures images as viewed through the right side windshield portion 104, a right wiper 116 which sweeps the windshield 101 including sweeping a windshield portion in front of the right camera 108 aperture, a left wiper motor (LWM) 110 for moving the left wiper 114, a right wiper motor (RWM) 112 for moving the right wiper 118, and a control device 118, e.g., for controlling wiper motion, for controlling camera operation, and/or for controlling wiper motion and camera capture synchronization, in accordance with an exemplary embodiment.

In various embodiments, the cameras (106, 108) are controlled, via control device 118, to capture images after the wipers (114, 116), respectively, have completed, e.g., just completed, sweeping the portions of the windshield 101, to which the camera (106, 108) apertures correspond. The captured images, which are views through a clear or substantially clear windshield portion, e.g., irrespective of weather conditions, e.g., rain or snow, are used to generate a depth map. A vehicle control operation, e.g., one of a direction, braking or speed control operation, is performed as a function of the generated depth map.

Figure 2:
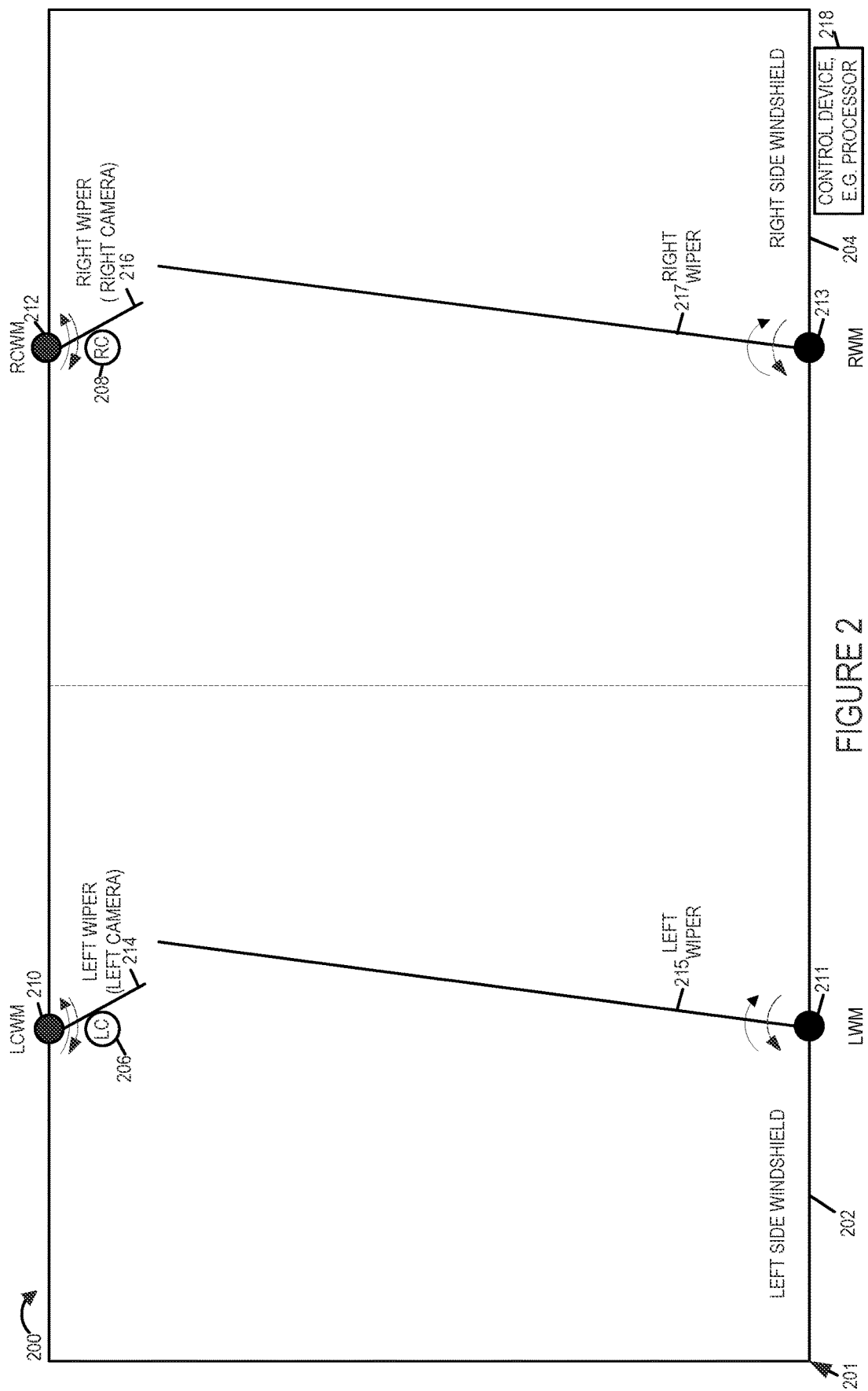
FIG. 2 illustrates exemplary camera and exemplary wipers, included in a vehicle, in which wiper motions and camera capture are synchronized in accordance with an exemplary embodiment.

FIG. 2 is a drawing 200 which illustrates exemplary cameras, left camera (LC) 206 and right camera (RC) 208, and exemplary wipers, left wiper 214, right wiper 216, included in a vehicle, included in an exemplary vehicle implemented in accordance with features of the present invention, wherein wiper motion and camera capture are synchronized in accordance with an exemplary embodiment. Drawing 200 illustrates components included as part of an exemplary vehicle including an exemplary windshield 201 including a left side windshield portion 202 and a right side portion 204, a left camera 206, mounted inside the car behind the left side windshield portion 202, which captures images as viewed through the left side windshield portion 202, a left wiper 214, sometimes referred to as a left camera wiper, which sweeps a small portion of windshield 201 including sweeping a windshield portion in front of the left camera 206 aperture, a right camera 208, mounted inside the car behind the right side windshield portion 204, which captures images as viewed through the right side windshield portion 204, a right wiper 216, sometimes referred to as a right camera wiper, which sweeps a small portion of windshield 201 including sweeping a windshield portion in front of the right camera 208 aperture, a left camera wiper motor (LCWM) 210 for moving the left wiper 214, a right camera wiper motor (RCWM) 212 for moving the right wiper 118, and a control device 218, e.g., for controlling wiper motion, for controlling camera operation, and/or for controlling wiper motion and camera capture synchronization, in accordance with an exemplary embodiment.

In various embodiments, the cameras (206, 208) are controlled, via control device 218, to capture images after the wipers (214, 216), respectively, have completed, e.g., just completed, sweeping the portions of the windshield 201, to which the camera (206, 208) apertures correspond. The captured images, which are views through a clear or substantially clear windshield portion, e.g., irrespective of weather conditions, e.g., rain or snow, are used to generate a depth map. A vehicle control operation, e.g., one of a direction, braking or speed control operation, is performed as a function of the generated depth map.

Drawing 200 further includes left wiper 215, left wiper motor (LWM) 211, right wiper 217 and right wiper motor (RWM) 213. In the example of FIG. 2, the left and right wipers 215, 216 clear areas of the windshield 201 which are outside the areas via which the cameras (206, 208) view the environment.

Figure 3A:
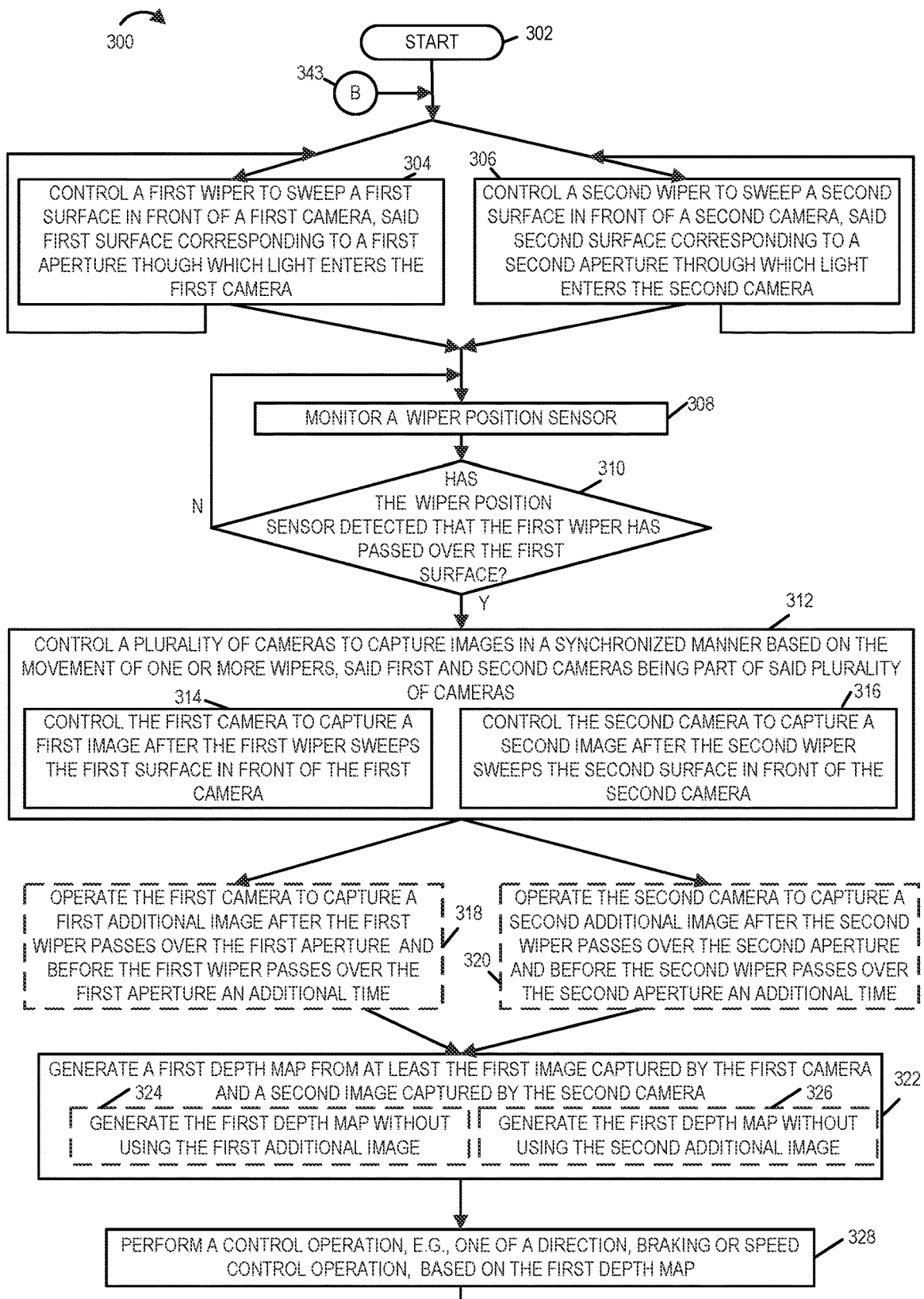
FIG. 3A is a first part of a flowchart of an exemplary method of operating cameras and wipers in a coordinated manner in accordance with an exemplary embodiment.

FIG. 3, comprising the combination of FIG. 3A and FIG. 3B, is a flowchart 300 of an exemplary method of operating cameras and wipers in a coordinated manner in accordance with an exemplary embodiment. Operation starts in step 302 and proceeds to steps 304 and step 306.

In step 304 a first wiper is controlled to sweep a first surface in front of a first camera, said first surface corresponding to a first aperture though which light enters the first camera. In step 306, a second wiper is controlled to sweep a second surface in front of a second camera, said first surface corresponding to a second aperture though which light enters the second camera. Operation proceeds from steps 304 and step 306 to step 308.

In step 308 the wiper position sensor is monitored. Operation proceeds from step 308 to step 310. In step 310 if the monitoring of the wiper position sensor has detected that the first wiper has passed over the first surface, then operation proceeds from step 310 to step 312; otherwise, operation proceeds from step 310 to the input of step 308.

In step 312 a plurality of cameras are controlled to capture images in a synchronized manner based on the movement of one or more wipers, said first and second cameras being part of said plurality of cameras. Step 312 includes step 314 in which the first camera is controlled to capture a first image after the first wiper sweeps the first surface in front of the first camera. In step 316 the second camera is controlled to capture a second image after the second wiper sweeps the second surface in front of the second camera. In some embodiments, said first and second cameras are controlled to capture the first and second images at the same time. In some embodiments, operation proceeds from step 312 to steps 318 and 320. In some other embodiments, steps 318 and 320 are bypassed and operation proceeds from step 312 to step 322.

In step 318 the first camera is operated to capture a first additional image after the wiper passes over the first aperture and before the first wiper passes over the first aperture and additional time. In step 320 the second camera is operated to capture a second additional image after the second wiper passes over the second aperture and before the second wiper passes over the second aperture and additional time. Operation proceeds from steps 318 and 320 to step 322.

In step 322 a first depth map is generated from at least the first image captured by the first camera and a second image captured by the second camera. In some embodiments, step 322 includes one or both of steps 324 and 326. In step 324 the first depth map is generated without using the first additional image. In step 326 the first depth map is generated without using the second additional image. Operation proceeds from step 322 to step 328.

In step 328 a control operation, e.g., a vehicle control operation, is performed based on the first depth map. The vehicle control operation is, e.g. one of a direction, braking or speed control operation. In some embodiments, operation proceeds from step 328, via connecting node A 329, to steps 330, 332 and 334. In some other embodiments, steps 330, 332, 334, 340 and 342 are bypassed, and operation proceeds from step 328, via connecting node A 329 and connecting node B 343 to steps 304 and 306.

In step 330 image capture performed by a third camera is controlled as a function of a movement of a third wiper over a third surface in front of said third camera. In some embodiments, step 330 includes step 336 in which the third camera is controlled to capture the third image at a predetermined time offset from the time at which the first camera captures said first image, capture of said third image following capture of said first image.

In step 332, image capture performed by a fourth camera is controlled as a function of a movement of a fourth wiper over a fourth surface in front of said fourth camera. In some embodiments, step 332 includes step 338 in which the fourth camera is controlled to capture the fourth image while said third camera captures said third image.

In step 334 said third and fourth wipers are controlled to move in a synchronized manner, controlling aid third and fourth wipers to move in a synchronized manner including controlling said fourth wiper to sweep across a face of said fourth cameras at a time at which said third wiper sweeps across a face of said third camera.

Operation proceeds from step 330, 332 and 334 to step 340. In step 340 a second depth map is generated from at least a third image captured by the third camera and a fourth image captured by the fourth camera. Operation proceeds from step 340 to step 342. In step 342 a control operation, e.g., a vehicle control operation is performed based on the second depth map. The vehicle control operation is, e.g., one of a direction, braking or speed control operation. Operation proceeds from step 342, via connecting node B 343, to steps 304 and steps 306.

In some embodiments, the first and second wipers are mounted on a vehicle. In some embodiments, the first and second surfaces are portion of a single piece of glass, e.g., a windshield. In various embodiments, the first surface corresponds to a first aperture through which light enters the first camera, and the second surface corresponds to a second aperture through which light enters the second camera.

In some embodiments, the first and second images include at least one image captured immediately after the first wiper passes in front of the first camera and prior to the first wiper changing the direction of the first wiper movement, e.g., before the wiper reaches its maximum movement in a given direction and begins to sweep back in the return direction. In some embodiments, the first image is an image captured immediately after the first wiper passes in front of the first camera and prior to the first wiper changing the direction of the first wiper movement, e.g., before the first wiper reaches its maximum movement in a given direction and begins to sweep back in the return direction, and the second image is an image captured immediately after the second wiper passes in front of the second camera and prior to the second wiper changing the direction of the second wiper movement, e.g., before the second wiper reaches its maximum movement in a given direction and begins to sweep back in the return direction.

In some embodiments, the first and second camera are spaced apart from one another by a first fixed distance; and said third and fourth cameras are spaced apart from one another by a second fixed distance, said second fixed distance being the same or different from said first fixed distance. In various embodiments, said first and second cameras have overlapping fields of view. In various embodiments, said third and fourth cameras have overlapping fields of view.

In some embodiments, the first and second cameras are part of a first camera pair mounted inside the vehicle, the first surface in front of the first camera is a first portion of said windshield and the second surface in front of the said second camera is a second portion of said windshield. In some embodiments, the third and fourth cameras are part of a second camera pair mounted inside the vehicle, the third surface in front of the third camera is a third portion of said windshield and the fourth surface in front of the said fourth camera is a fourth portion of said windshield.

In various embodiments, an image which is captured far away from the time a wiper sweeps over a surface in front of the camera capturing the image is not used in generating a depth map. In various embodiments, a captured image closest to when the wiper completes the sweep over the surface in front of the camera (and for which the wiper does not obstruct viewing) is used in generating a depth map.

Figure 5:
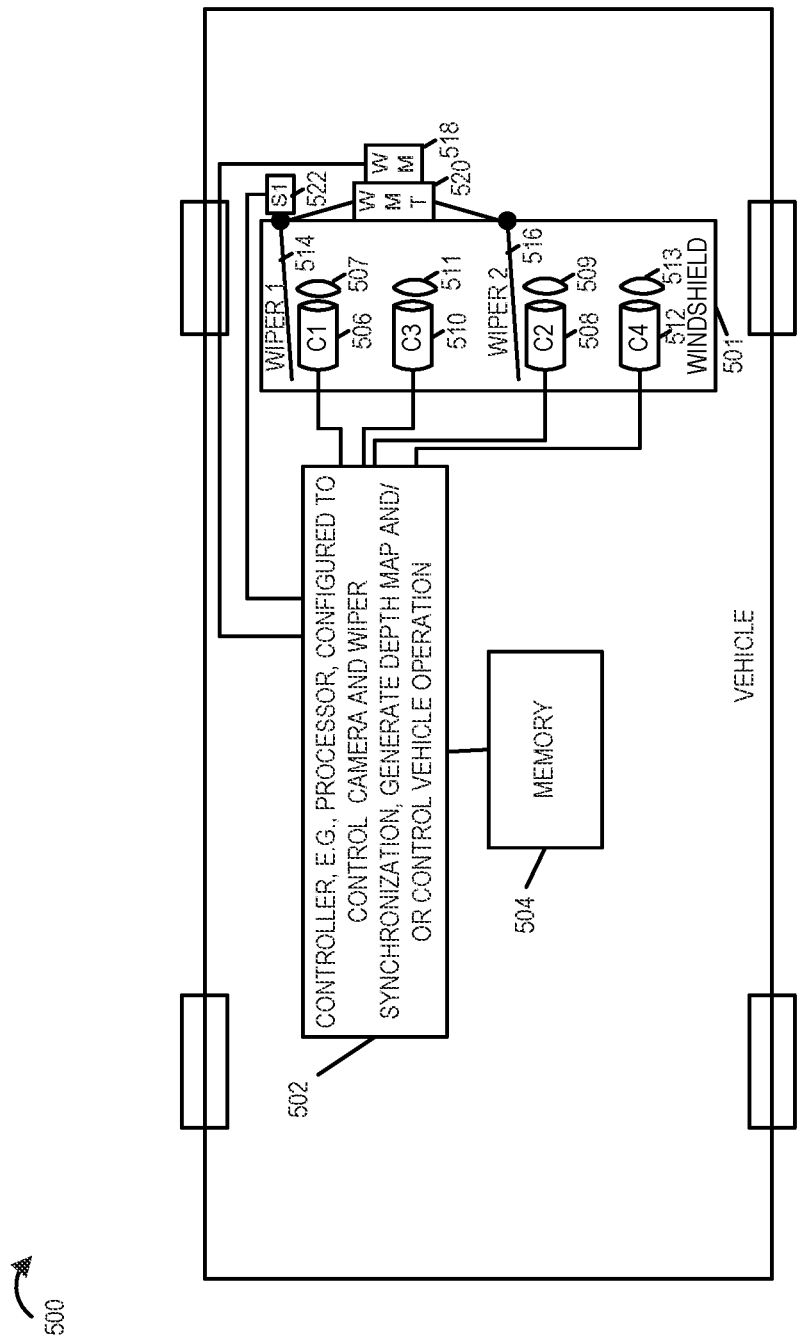
FIG. 5 is a drawing of an exemplary vehicle including a plurality of cameras, which capture images through a windshield, which is sweep by a plurality of wipers, and wherein wiper operation is coordinated with image capture in accordance with an exemplary embodiment.

In one exemplary embodiment, e.g., an embodiment which does not include steps 330, 332, 334, 340 and 342, vehicle 500 or one or more components in vehicle 500 of FIG. 5, e.g., controller 502, performs the steps of the method 300 of FIG. 3. The controller in some embodiments is implemented as a processor. The processor in one such embodiment is configured to control camera and wiper synchronization, generate one or more depth maps from captured images and/or control vehicle operation, e.g., braking, acceleration and/or turning based in some cases on a depth map generated from captured images, e.g., to avoid a collision, implement a lane change and/or follow a path to a destination entered into the control system by an operator of the vehicle 500. The controllers shown in other figures, e.g., controllers 602, 702 and 118 perform the same or similar functions as controller 502 and in some cases are implemented as a processor coupled to the devices and/or vehicle components to be controlled including the vehicle braking system which includes brakes which can be activated by the controller. In one exemplary embodiment, e.g., an embodiment which includes steps 330, 332, 334, 340 and 342, vehicle 700 or one or more components in vehicle 700 of FIG. 7, e.g., controller 702, performs the steps of the method 300 of FIG. 3.

Figure 4:
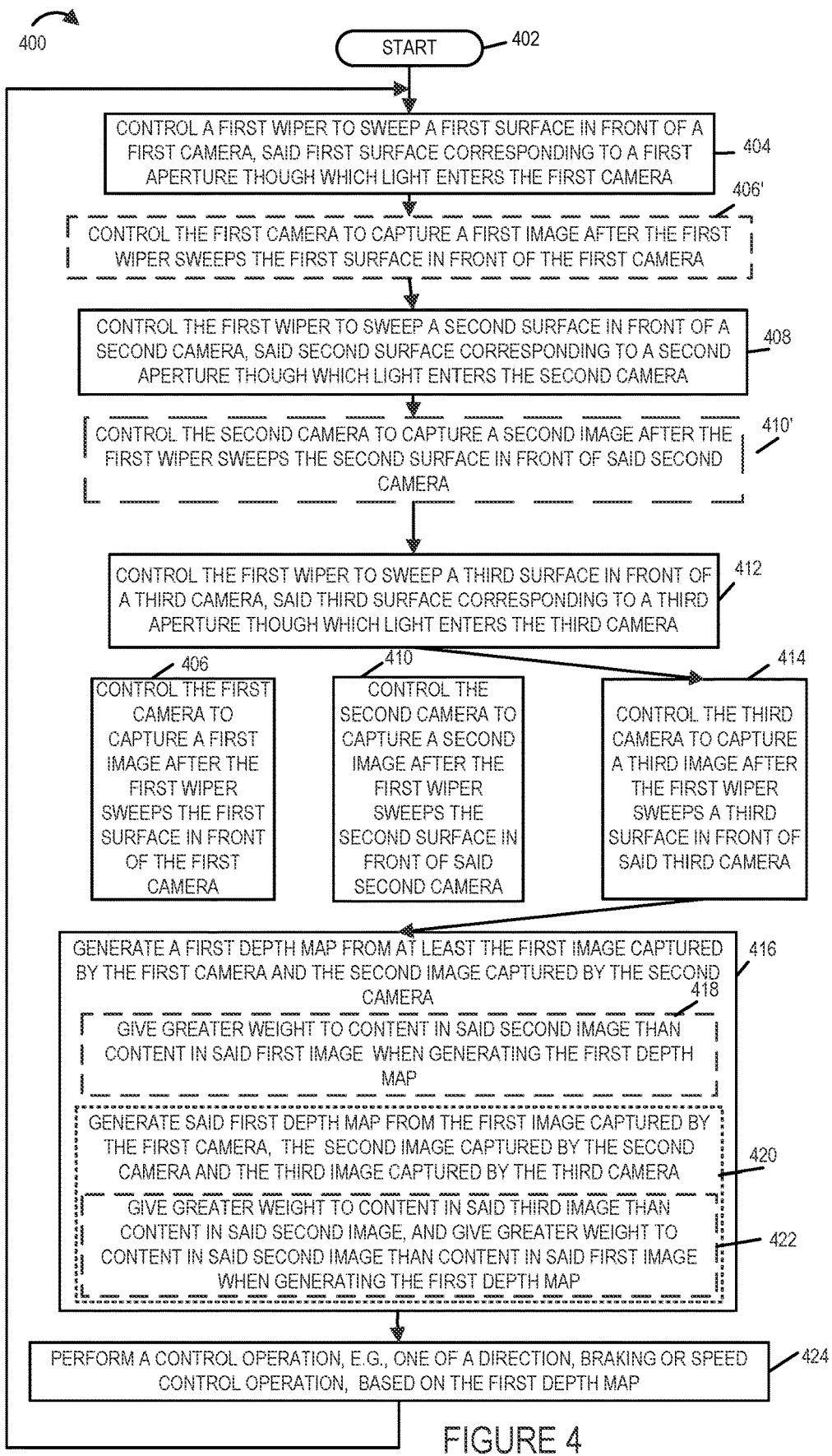
FIG. 4 is a flowchart of an exemplary method of operating cameras and a wiper in a coordinated manner in accordance with an exemplary embodiment.

FIG. 4 is a flowchart 400 of an exemplary method of operating cameras and a wiper in a coordinated manner in accordance with an exemplary embodiment. In the FIG. 4 embodiment the wiper sweeps over and cleans the surfaces in front of a first set of cameras before reversing and sweeping in front of the set of cameras in the reverse order. Depending on the particular embodiment the cameras, e.g., first, second and third cameras, are operated to capture images in parallel see, e.g., steps 406, 410, 414 shown in solid lines or sequentially, see steps 406', 410' and 414 in the order the wiper cleans in front of the cameras. While three cameras and image captures are used in the example two or more cameras can be and sometimes are used with the number of cameras depending on the embodiment and often including 3, 4 or more cameras. After the wiper cleans in front of the cameras and before the wiper passes over the cameras again in a reverse sweep the process shown in FIG. 4 is performed with a set of images being captured for the forward sweep. Another set of images corresponding to the reverse sweep may be and sometimes are captured to generate a second depth map. The cameras may be and sometimes are configured so the wiper passes over the aperature in front of the cameras at the same time. However, in other embodiments the wiper may pass over different cameras at different times. In some embodiments for purposes of depth map generation the weight, e.g., influence, given to images captured by different cameras is made dependent on the time image capture and wiper passing over the area in front of the camera. Images corresponding to a greater time interval between the wiper passing over the area in front of the camera and image capture are given lower weight and thus have less influence on depth map generation. This is because the longer the time between image capture and the wiper passing in front of the camera the greater the chance for rain or dirt to collect on the glass or other material in front of the camera.

In cases where the passage over cameras occurs sequentially, the weight given to images from individual cameras can and sometimes is different for the forward and reverse sweep given that the time from when the surface in front of a camera and image is captured will normally be different depending on whether the sweep was in the forward or reverse direction in such a sequential wiper passing over areas in front of cameras even though the images may be and sometimes are captured at the same time.

Operation starts in step 402 and proceeds to step 404. In step 404 a first wiper is controlled to sweep a first surface in front of a first camera, said first surface corresponding to a first aperture through which light enters the first camera. The first surface may be and sometimes is a vehicle windshield portion in front of the first camera. Operation proceeds from step 404 to step 406' in cases of sequential image capture or directly to step 408 in the case of parallel image capture. In step 406' the first camera is controlled to capture a first image after the first wiper sweeps the first surface in front of the first camera, e.g., before the wiper passes another time in front of the first camera. While first image capture step 406' is shown immediately after step 404 in some embodiments rather than capture first, second and third images sequentially, first, second and third images are captured in parallel, e.g., at the same time after the wiper passes over and cleans the surface in front of the last camera in the set of cameras being used to capture images for depth map generation as shown in steps 406, 410 and 414 which occur in such an embodiment after the wiper passes in front of the first, second and third cameras. Depending on the arrangement the wiper may pass in front of the first, second and third cameras at the same, e.g., as in the case where the cameras are arranged along a vertical line with which the wiper aligns as it sweeps or rotates in front of the cameras at different times as in the case where the cameras are arranged in a horizontal row and the wiper sweeps left to right.

Operation proceeds from step 406 to step 408. In step 408 the first wiper is controlled to sweep a second surface in front of a second camera, said second surface corresponding to a second aperture through which light enters the second camera. The second surface may be and sometimes is a second portion of the vehicle windshield. Operation proceeds from step 408 to step 410' in the case of sequential image capture or directly to step 412. In step 410' the second camera is controlled to initiate capture of a second image after the first wiper sweeps the second surface in front of the second camera. Capture of the second image may occur prior to capture of a third image by the third camera when step 410' is implemented but in some embodiments is performed in parallel in step 410 with capture of a third image which occurs in step 414. In some other embodiments, e.g., in embodiments with more than two cameras in the camera set used to capture images for depth map generation purposes, operation proceeds from step 410 to step 416.

In step 412 the first wiper is controlled to sweep a third surface in front of the a third cameras, said third surface corresponding to a third aperture through which light enters the third camera. The third surface may be a portion of the windshield in front of the third camera. Operation proceeds from step 412 to step 414. In step 414 the third camera is controlled to initiate capture of a third image after the first wiper sweeps a third surface in front of the third camera. Capture of the third image may occur at the same time as capture of the first and second images in steps 406, 410 or after capture of the first and second images in steps 406' and 410' and before the wiper passes over the third surface in front of the third camera again. Operation proceeds from step 414 to step 416.

In step 416 a first depth map is generated from at least the first image captured by the first camera and the second image captured by the second camera. In step 416 time from when a wiper passed over an area captured in front of a camera may be taken into consideration. When the wiper passes over the cameras at the same time the images from different cameras will normally be treated the same. However, when the wiper passes in front of different cameras at different times, the time from the wiper passage in front of the camera to image capture may be taken into consideration with the image corresponding to the shortest amount of time from wiping being given the greatest weight, e.g., influence, when generating a depth map as compared to other captured images. In some embodiments, step 416 includes step 418 in which greater weight is given to content in said second image than content in said first image when generating the first depth map. Thus in some embodiments the second image is more influential in the output come of the depth map generation process than the first image, e.g., because the amount of time from wiper passage in front of the second camera and image capture is less than the amount of time between passage of the wiper in front of the first camera and capture of the first image. In the case where the first and second images are captured at the same time and the wiper passes over the cameras at the same time, such prioritization of images may not be implemented since the amount of time for dirt to accumulate since the wiper sweep in front of the first and second cameras will be the same. In some embodiments, e.g., embodiments including steps 412 and 414, step 416 includes step 420, in which the first depth map is generated from the first image captured by the first camera, the second image captured by the second camera, and the third image captured by the third camera. In some embodiments, step 420 includes step 422, in which greater weight is given to content in said third image than content in said second image, and greater weight is given to content in said second image than content in said first image, when generating the first depth map. This is because the wiper will have passed over the third surface last and the third camera is thus likely to have the cleanest image in the case of the forward direction wiper sweep in cases where the wiper passes over the cameras sequentially rather than at the same time. Operation proceeds from step 416 to step 424.

In step 424 a control operation, e.g., a vehicle control operation, is performed based on the first depth map. The vehicle control operation is, e.g., one of a direction, braking or speed control operation. This may and sometimes does involve the processor activating the brakes of the vehicle or controlling the speed control, e.g., cruise control, to slow the vehicle. Operation proceeds from step 424 to step 404.

In some embodiments between 424 and step 404 the wiper sweeps in the reverse direction passing over the third, second and then first surface area. A second set of first, second and third images is captured by the first, second and third cameras in parallel, e.g., at the same time, after the first surface area in front of the first camera is cleaned. The images in the second set of images are then processed to generate a second depth map with the priority of images for the second depth map generation being reversed to reflect the reverse direction and timing of the wiper. Thus when generating the second depth map in such an embodiment, and the wiper passes over the cameras sequentially rather than at the same time, the first image is given greater weight and influence when generating the second depth map than the second or third images. The second image is given greater weight when generating the second depth map than the third image. In such an embodiment a depth map is generated based on the images corresponding to each pass of the wiper in front of the set of cameras used to capture images used in generating a depth map with the weight of the images depending on which one corresponds to the most recently cleaned surface, e.g., windshield portion.

In some embodiments, the first wiper is mounted on a vehicle. In some embodiments, the first and second surfaces are portions of a single piece of glass, e.g., a windshield. In some embodiments, the first, second, and third surfaces are portions of a single piece of glass. In various embodiments, the first surface corresponds to a first aperture through which light enters the first camera, and the second surface corresponds to a second aperture through which light enters the second camera and the third surface corresponds to a third aperture of the third camera.

Figure 6:
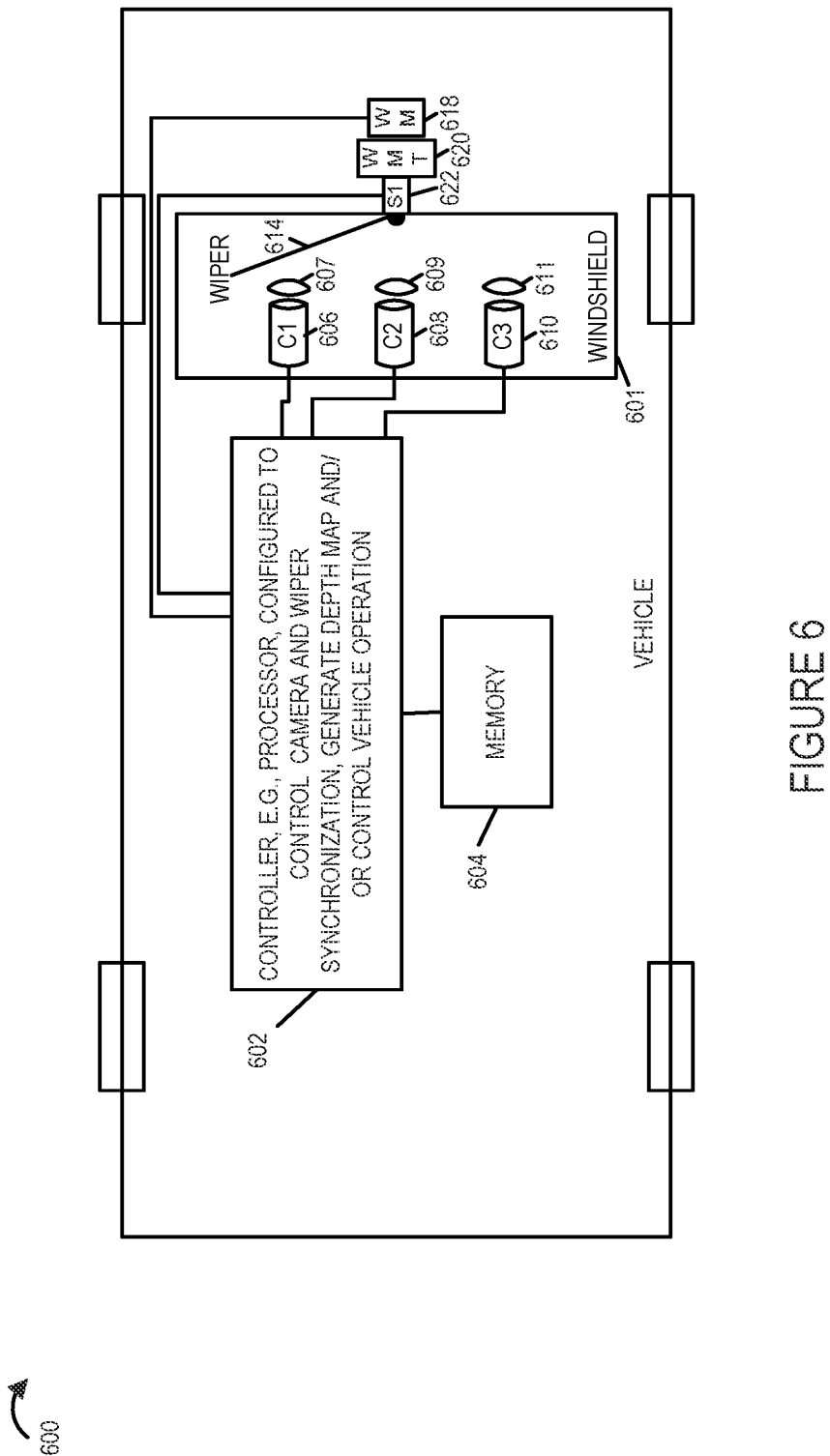
FIG. 6 is a drawing of an exemplary vehicle including a plurality of cameras, which capture images through a windshield, which is sweep by a wiper, and wherein wiper operation is coordinated with image capture in accordance with an exemplary embodiment.

In one exemplary embodiment, e.g., an embodiment which includes steps 412 and 414, vehicle 600 or one or more components in vehicle 600 of FIG. 6, e.g., controller 602, performs the steps of the method 400 of FIG. 4.

In some embodiments, a vehicle implements a method in accordance with flowchart 300 of FIG. 3 for controlling a plurality of front windshield wipers a set of forward facing cameras looking through a front windshield; and implements a method in accordance with flowchart 400 of FIG. 4 for controlling a single rear back window wiper and a set of rear facing cameras looking through a rear window of the vehicle.

FIG. 5 is a drawing of an exemplary vehicle 500 including a plurality of cameras, camera 1 (C1) 506, camera 2 (C2) 508, camera 3 (C3) 510 and camera 4 (C4) 512, which capture images through a windshield 501, which is sweep by a plurality of wipers, wiper 1 514 and wiper 2 516, and wherein wiper operation is coordinated with image capture in accordance with an exemplary embodiment. Exemplary vehicle 500 includes a windshield 501, a controller 502, e.g., a camera/wiper synchronization controller, memory 504, a first camera C1 506 mounted inside the vehicle and facing outward to capture images as viewed through the windshield 501, a second camera C2 508 mounted inside the vehicle and facing outward to capture images as viewed through the windshield 501, a third camera C3 510 mounted inside the vehicle and facing outward to capture images as viewed through the windshield 501, a fourth camera C4 512 mounted inside the vehicle and facing outward to capture images as viewed through the windshield 501, a first wiper, wiper 1 514, a second wiper, wiper 2 516, a wiper motor (WM) 518, a wiper motor transmission (WMT) 520, and wiper position sensor S1 522 for detecting the position of wiper 1 514. The wiper motor 518 is coupled to the controller 502, which controls operation of the wiper motor 518, e.g., on/off, speed, type of operation, e.g. continuous/intermittent, etc. The wiper motor 518 is coupled to the wiper motor transmission (WMT) 520, which is coupled, e.g., via mechanical linkages or cables, to the wiper pivots, which are controlled to rotate to cause wiper sweep of the windshield. Sensor S1 522, which detects the position of wiper 1 514, is coupled to controller 502, and provides input to the controller, e.g., facilitating synchronization operations.

Controller 502 is coupled to each of the cameras (C1 506, C2 508, C3 510, C4 512). Controller 502 controls the cameras to initiate image capture, e.g., in response to a detected wiper position, e.g. including controlling a camera to capture an image subsequently, e.g. just subsequently, to a wiper clearing an area of the windshield in front of a camera aperture. Area 507 represents a portion of windshield 501 in front of the aperture of camera C1 506. Area 509 represents a portion of windshield 501 in front of the aperture of camera C2 508. Area 511 represents a portion of windshield 501 in front of the aperture of camera C3 510. Area 513 represents a portion of windshield 501 in front of the aperture of camera C4 512.

In some embodiments the wipers (514, 516) clear the areas (507, 509) of windshield 501 at the same time; and the wipers (514, 516) clear the areas (511, 513) of windshield 501 at the same time In some embodiments, pairs of cameras, e.g., the pair of C1 and C2, and the pair of C3 and C4, are controlled to capture images at the same time. Controller 502 receives images captured by each of the cameras (C1, C2, C3 C4). In some embodiments, controller 502 decides which of the captured images to use in generating a depth map and/or how to weight content from a captured image in generating a depth map. In some embodiments, controller 502 controls a vehicle control operation, e.g. one of a direction, braking, or speed control operation, to be performed in response to a generated depth map.

FIG. 6 is a drawing of an exemplary vehicle 600 including a plurality of cameras, (C1) 606, camera 2 (C2) 608 and camera 3 (C3) 610, which capture images through a windshield 601, which is sweep by a wiper 614, and wherein wiper operation is coordinated with image capture in accordance with an exemplary embodiment. Exemplary vehicle 600 includes a windshield 601, a controller 602, e.g., a camera/wiper synchronization controller, memory 604, a first camera C1 606 mounted inside the vehicle and facing outward to capture images as viewed through the windshield 601, a second camera C2 608 mounted inside the vehicle and facing outward to capture images as viewed through the windshield 601, a third camera C3 610 mounted inside the vehicle and facing outward to capture images as viewed through the windshield 601, a wiper 614, a wiper motor (WM) 618, a wiper motor transmission (WMT) 620, and a wiper position sensor S1 622 for detecting the position of wiper 614. The wiper motor 618 is coupled to the controller 602, which controls operation of the wiper motor 618, e.g., on/off, speed, type of operation, e.g. continuous/intermittent, etc. The wiper motor 618 is coupled to the wiper motor transmission (WMT) 620, which is coupled to a wiper arm pivot, which is controlled to rotate to cause wiper sweep of the windshield. Sensor S1 622, which detects the position of wiper 614, is coupled to controller 602, and provides input to the controller, e.g., facilitating synchronization operations.

Controller 602 is coupled to each of the cameras (C1 606, C2 608, C3 610). Controller 602 controls the cameras to initiate image capture, e.g., in response to a detected wiper position, e.g. including controlling a camera to capture an image subsequently, e.g. just subsequently, to the wiper 614 clearing an area of the windshield in front of a camera aperture. Area 607 represents a portion of windshield 601 in front of the aperture of camera C1 606. Area 609 represents a portion of windshield 601 in front of the aperture of camera C2 608. Area 611 represents a portion of windshield 601 in front of the aperture of camera C3 610.

Controller 602 receives images captured by each of the cameras (C1, C2, C3). In some embodiments, controller 602 decides which of the captured images to use in generating a depth map and/or how to weight content from a captured image in generating a depth map. In some embodiments, controller 602 controls a vehicle control operation, e.g. one of a direction, braking, or speed control operation, to be performed in response to a generated depth map.

Figure 7:
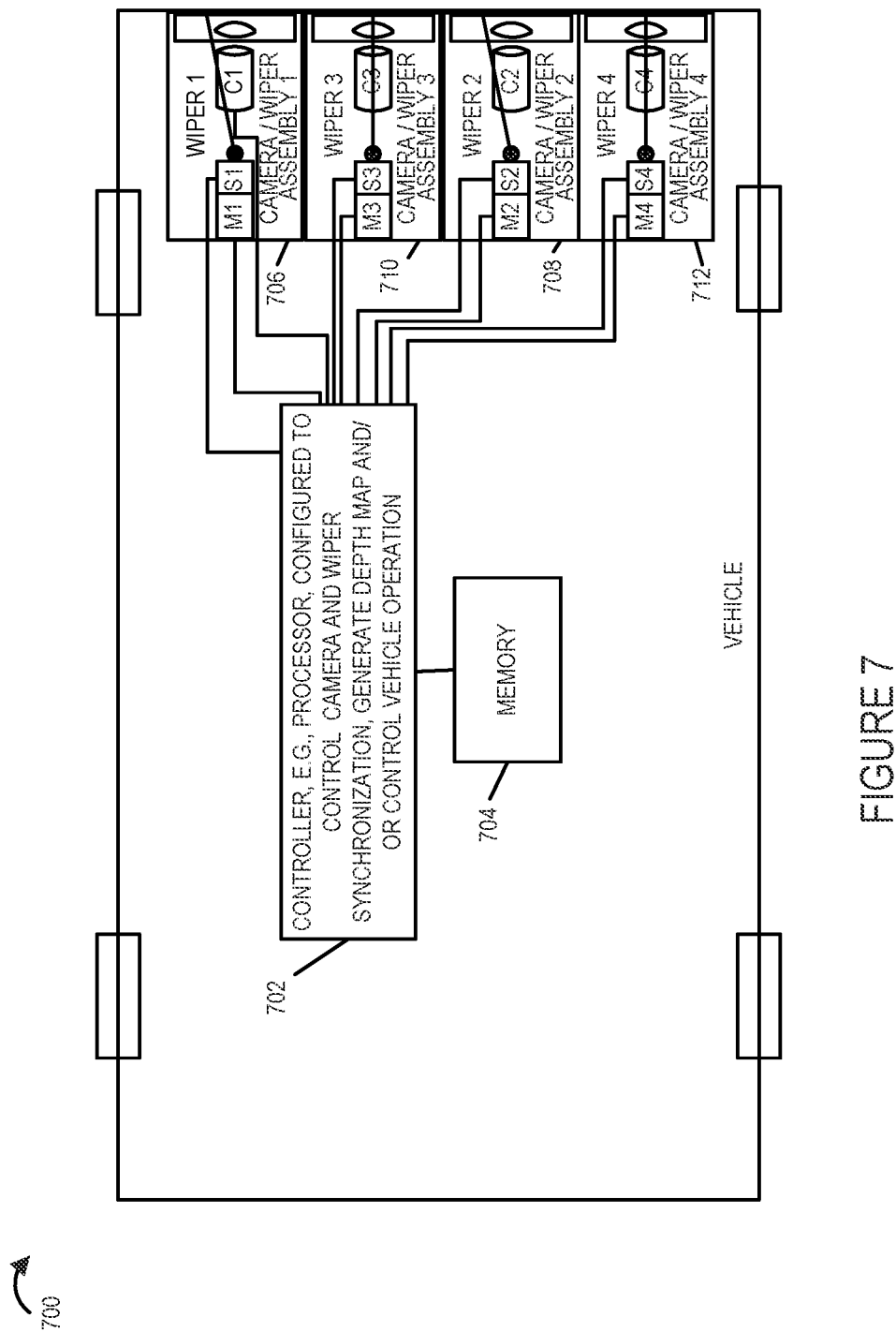
FIG. 7 is a drawing of an exemplary vehicle including a plurality of camera/wiper assemblies, in which wiper operation is coordinated with image capture in accordance with an exemplary embodiment.

FIG. 7 is a drawing of an exemplary vehicle 700 including a plurality of camera/wiper assemblies (camera/wiper assembly 1 706, camera wiper assembly 2 708, camera/wiper assembly 3 710, camera/wiper assembly 4 712), in which wiper operation is coordinated with image capture in accordance with an exemplary embodiment. Each camera/wiper assembly includes a camera, a wiper, a wiper motor, a wiper position sensor and a camera/wiper assembly windshield, e.g., a clear plastic or glass cover plate, including a portion corresponding to a camera aperture. In some embodiments pairs of camera wiper assemblies are synchronized. For example, camera/wiper assembly 1 706 is synchronized with camera/wiper assembly 2 708; and camera/wiper assembly 3 710 is synchronized with camera/wiper assembly 4 712. Exemplary vehicle 700 further includes a controller 702, e.g., a camera/wiper synchronization controller and memory 704 coupled together. Controller 702 is coupled to each of the cameras (C1, C2, C3, C4). Controller 702 controls the cameras to initiate image capture, e.g., in response to a detected wiper position, e.g. including controlling a camera to capture an image subsequently, e.g. just subsequently, to the wiper 614 clearing an area of the windshield in front of a camera aperture.

Controller 702 controls the wipers in the assemblies via controlling the wiper motors in the assemblies. Controller 702 controls the cameras to initiate image capture, e.g., in response to a detected wiper position, e.g. including controlling a camera to capture an image subsequently, e.g. just subsequently, to the wiper clearing an area of the windshield in front of a camera aperture. Controller 702 receives images captured by each of the cameras (C1, C2, C3, C4) of the camera/wiper assemblies (706, 708, 710, 712), respectively, which are used to generate depth maps. In some embodiments, controller 702 controls a vehicle control operation, e.g. one of a direction, braking, or speed control operation, to be performed in response to a generated depth map.

Figure 8:
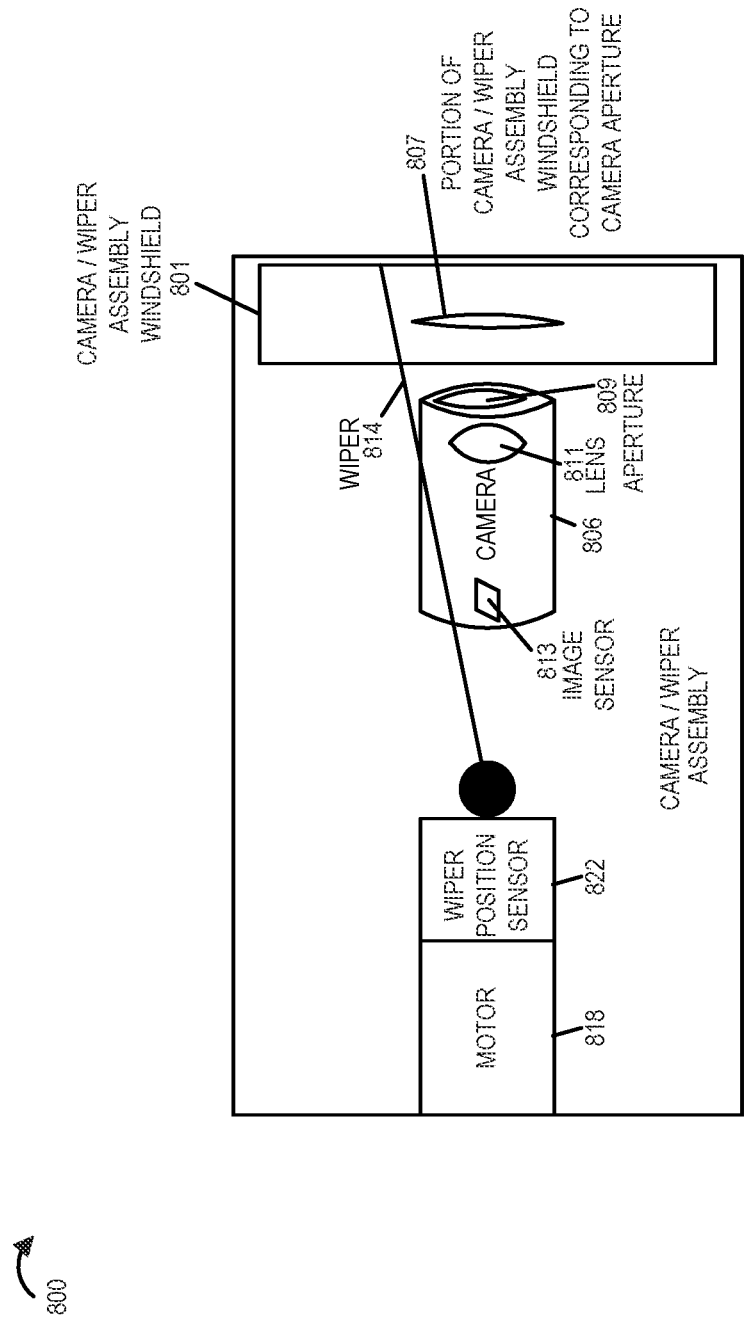
FIG. 8 is a drawing of an exemplary camera/wiper assembly, in accordance with an exemplary embodiment.

FIG. 8 is a drawing of an exemplary camera/wiper assembly 800, in accordance with an exemplary embodiment. Exemplary camera/wiper assembly 800 is, e.g., any of the camera/wiper assemblies camera/wiper assembly 1 706, camera/wiper assembly 2 708, camera/wiper assembly 3 710, camera/wiper assembly 4 712 of FIG. 7. In some embodiments, the camera/wiper assembly 800 is mounted on the exterior of a vehicle.

Camera wiper assembly 800 includes a camera 806, a camera/wiper assembly windshield 801, e.g., a glass or plastic transparent cover plate or lens, a wiper 814, a wiper position sensor 822 and a wiper motor 818. The camera wiper assembly windshield 801 includes a portion 807 corresponding to the aperture 809 of the camera 806. The wiper 814 includes a pivot, wiper arm and wiper blade. The wiper arm holds the wiper blade, which rubs against the windshield to clean the windshield. The pivot attaches the wiper arm to the wiper motor 818. The wiper position sensor 822 detects the position of the wiper 814 and is used to determine when the wiper has cleared the portion 807 of the windshield 801, e.g., just completed sweeping the portion 807. The camera/wiper assembly 800 is coupled to a controller or processor which is used to control wiper motion and image capture, said control including synchronizing wiper motion with image capture. The camera 806 includes an aperture 809, one or more lenses 811, and an image sensor 813 for capturing images. In some embodiments, the camera 806 includes a light redirection device, e.g., a mirror or prism. In some embodiments, the camera 806 includes a movable barrel and/or a movable lens, which can be moved to change zoom. Exemplary camera 806 may be used as one of the cameras in any of the other Figures.

Figure 9:
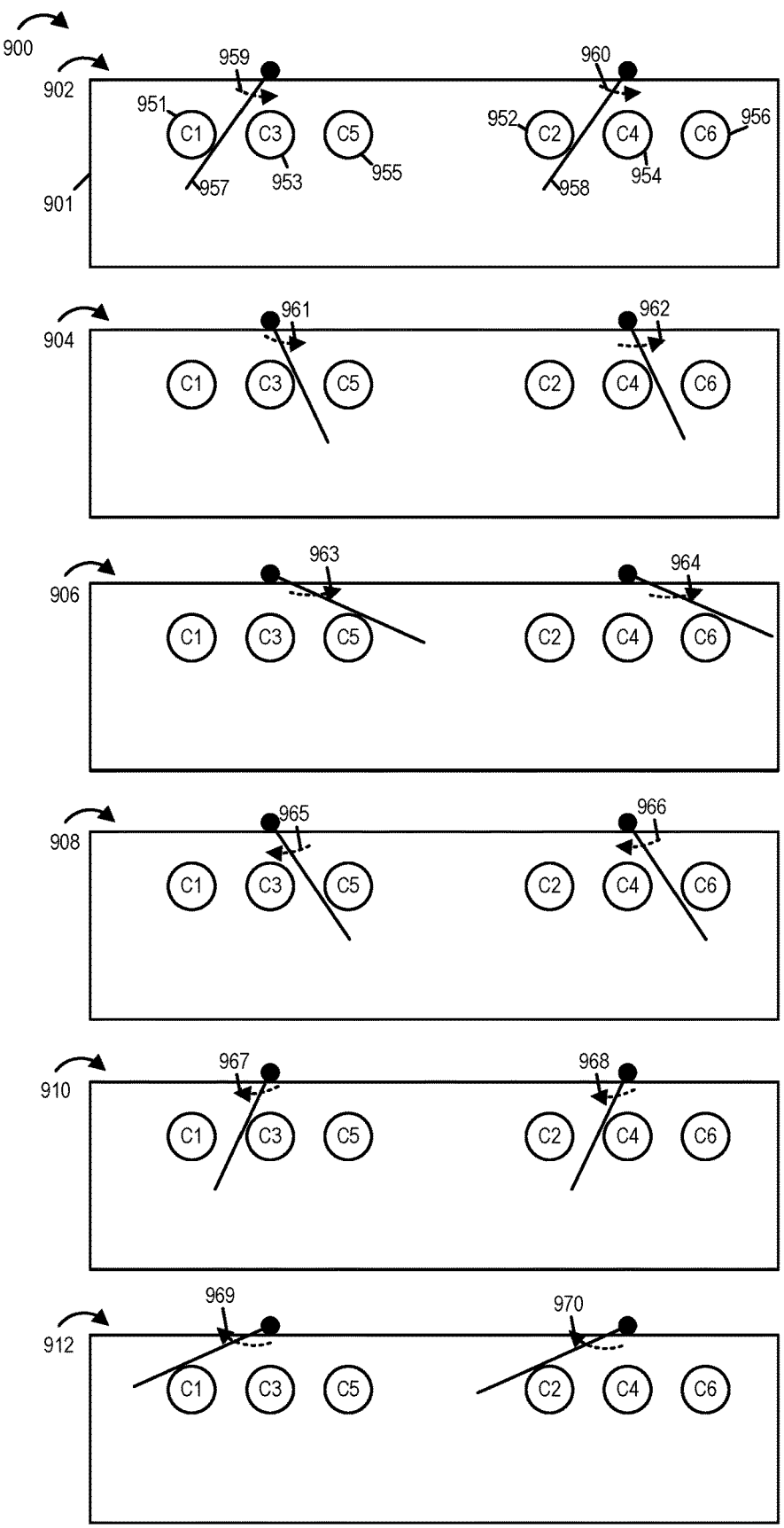
FIG. 9 is a drawing including a sequence of drawing representing controlled wiper position at six different times in which image capture for a pair of cameras is initiated in accordance with an exemplary embodiment in which multiple cameras share the same wiper.

FIG. 9 is a drawing 900 including a sequence of drawing (902, 904, 906, 908, 910, 912) representing controlled wiper position at six different times in which image capture for a pair of cameras is initiated in accordance with an exemplary embodiment. FIG. 9 represents six snapshots during the wiper sweep of the windshield. In the example of FIG. 9, there are 6 cameras (C1 951, C2 952, C3 953, C4 954, C5 955, C6 956) which are located in a vehicle behind windshield 901 and are pointed to capture images through windshield 901. In the example of FIG. 9 there are two wipers, wiper 957 and wiper 958. Wiper 957 is controlled to sweeps the areas of the windshield which include areas corresponding to the apertures of camera C1 951, camera C3 953 and camera C5 955.

In drawing 902 wiper 957 is moving in the direction of arrow 959 and has just cleared the area in front of camera C1 951; and wiper 958 is moving in the direction of arrow 960 and has just cleared the area in front of camera C2 952. At this time, the controller in the vehicle controls camera C1 957 and camera C2 952 to initiate image capture, and the captured images are used to generate a depth map.

In drawing 904 wiper 957 is moving in the direction of the arrow 961 and has just cleared the area in front of camera C3 953; and wiper 958 is moving in the direction of arrow 962 and has just cleared the area in front of camera C4 954. At this time, the controller in the vehicle controls camera C3 953 and camera C4 954 to initiate image capture, and the captured images are used to generate a depth map.

In drawing 906 wiper 957 is moving in the direction of the arrow 963 and has just cleared the area in front of camera C5 955; and wiper 958 is moving in the direction of arrow 964 and has just cleared the area in front of camera C6 956. At this time, the controller in the vehicle controls camera C5 955 and camera C6 956 to initiate image capture, and the captured images are used to generate a depth map.

In drawing 908 wiper 957 is moving in the direction of the arrow 965 and has just cleared the area in front of camera C5 955; and wiper 958 is moving in the direction of arrow 966 and has just cleared the area in front of camera C6 956. At this time, the controller in the vehicle controls camera C5 955 and camera C6 956 to initiate image capture, and the captured images are used to generate a depth map.

In drawing 910 wiper 957 is moving in the direction of the arrow 967 and has just cleared the area in front of camera C3 953; and wiper 958 is moving in the direction of arrow 968 and has just cleared the area in front of camera C4 954. At this time, the controller in the vehicle controls camera C3 953 and camera C4 954 to initiate image capture, and the captured images are used to generate a depth map.

In drawing 912 wiper 957 is moving in the direction of arrow 969 and has just cleared the area in front of camera C1 951; and wiper 958 is moving in the direction of arrow 970 and has just cleared the area in front of camera C2 952. At this time, the controller in the vehicle controls camera C1 957 and camera C2 952 to initiate image capture, and the captured images are used to generate a depth map.

Figure 10:
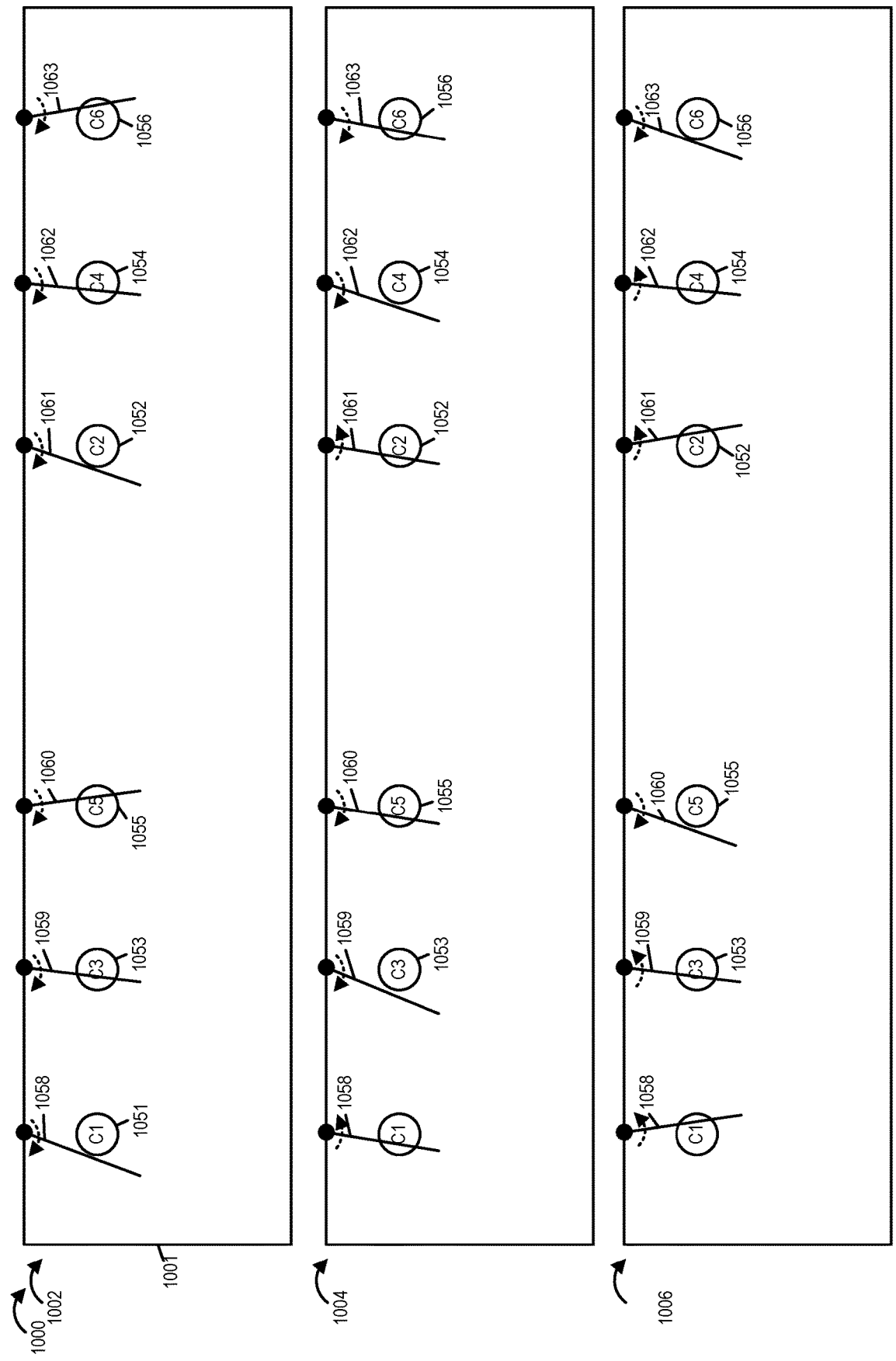
FIG. 10 is a drawing including a sequence of drawing representing controlled wiper position at three different times in which image capture for a pair of cameras is initiated in accordance with an exemplary embodiment in which there is an individual wiper for each camera.

FIG. 10 is a drawing 1000 including a sequence of drawing representing controlled wiper position at three different times in which image capture for a pair of cameras is initiated in accordance with an exemplary embodiment. FIG. 10 represents three snapshots during the wiper sweep of the windshield. In the example of FIG. 10, there are 6 cameras (C1 1051, C2 1052, C3 1053, C4 1054, C5 1055, C6 1056) which are located in a vehicle behind windshield 1001 and are oriented, e.g., pointed via a fixed mount, to capture images through windshield 1001. In the example of FIG. 10 there are six wipers, one wiper for each camera.

Wiper 1058 is controlled to sweep an area of windshield 1001 including an area corresponding to the aperture of camera C1 1051. Wiper 1061 is controlled to sweep an area of windshield 1001 including an area corresponding to the aperture of camera C2 1054.

Wiper 1059 is controlled to sweep an area of windshield 1001 including an area corresponding to the aperture of camera C3 1053. Wiper 1062 is controlled to sweep an area of windshield 1001 including an area corresponding to the aperture of camera C4 1054.

Wiper 1060 is controlled to sweep an area of windshield 1001 including an area corresponding to the aperture of camera C5 1055. Wiper 1063 is controlled to sweep an area of windshield 1001 including an area corresponding to the aperture of camera C6 1056.

In drawing 1002 wiper 1058 has just cleared the area in front of camera C1 1051; and wiper 1061 has just cleared the area in front of camera C2 1052. At this time, the controller in the vehicle controls camera C1 1051 and camera C2 1052 to initiate image capture, and the captured images are used to generate a depth map.

In drawing 1004 wiper 1059 has just cleared the area in front of camera C3 1053; and wiper 1062 has just cleared the area in front of camera C4 1055. At this time, the controller in the vehicle controls camera C3 1053 and camera C4 1054 to initiate image capture, and the captured images are used to generate a depth map.

In drawing 1006 wiper 1060 has just cleared the area in front of camera C5 1055; and wiper 1063 has just cleared the area in front of camera C6 1056. At this time, the controller in the vehicle controls camera C5 1055 and camera C6 1056 to initiate image capture, and the captured images are used to generate a depth map.

Figure 11:
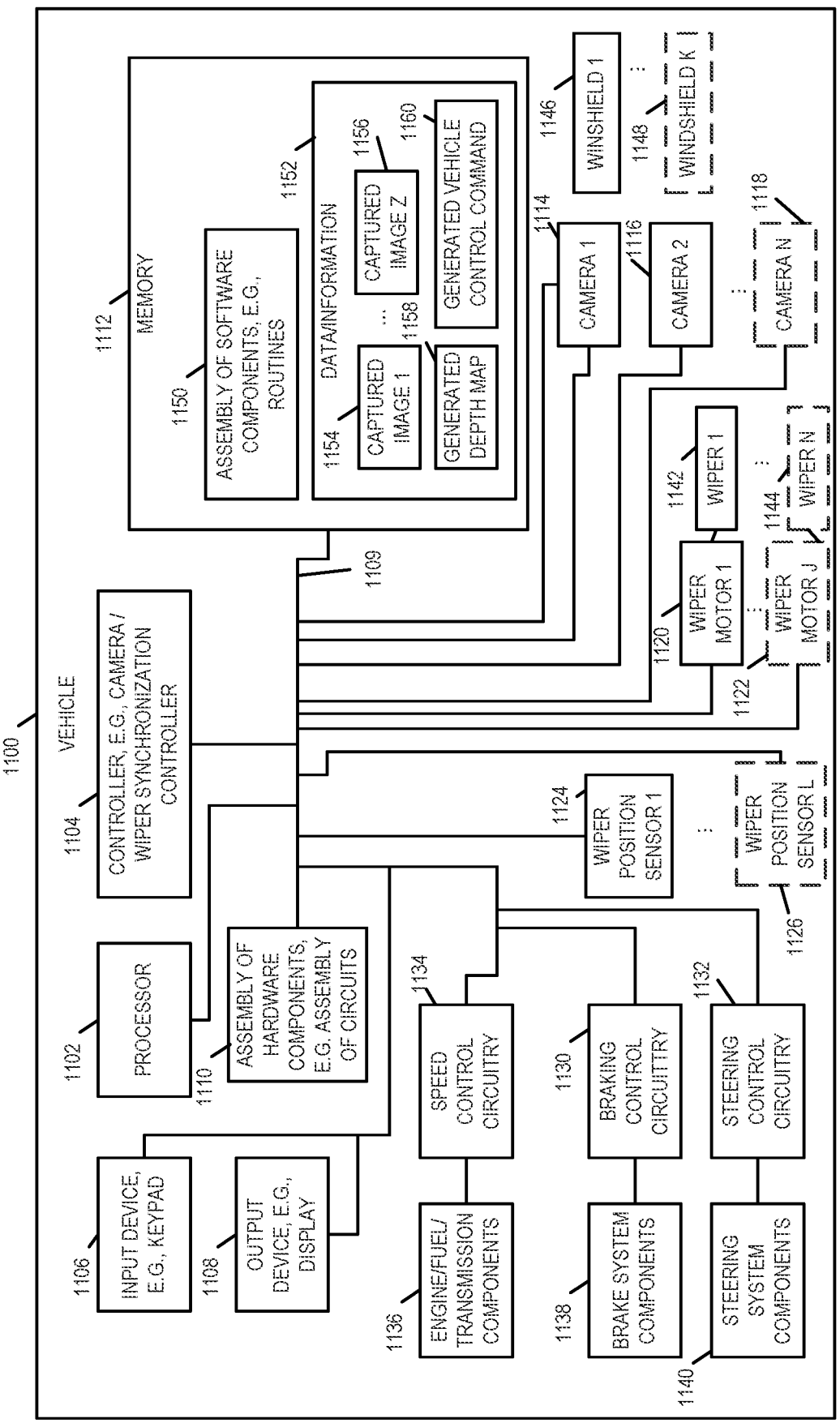
FIG. 11 is a drawing of an exemplary vehicle in which wiper position and camera image capture are coordinated in accordance with an exemplary embodiment.

FIG. 11 is a drawing of an exemplary vehicle 1100 in which wiper position and camera image capture are coordinated in accordance with an exemplary embodiment. Exemplary vehicle 1100 includes a processor 1102, e.g., a CPU, a controller 1104, e.g., a camera/wiper synchronization controller 1104, a input device 1106, e.g., a keypad, an output device 1108, e.g., a display, an assembly of hardware components 1110, e.g., an assembly of circuits, memory 1112, a plurality of cameras (camera 1 1114, camera 2 1116, ..., camera N 1118), one or more wiper motors (wiper motor 1 1120, ..., wiper motor J 1122), one or more wiper positions sensors (wiper position sensor 1 1124, ..., wiper position sensor L 1126), speed control circuitry 1134, braking control circuitry 1130, and steering control circuitry 1132 coupled together via a bus 1109 over which the various components may interchange data and information. Vehicle 1100 further includes one or more windshields (windshield 1 1146, e.g., a front window, ..., windshield K 1148, e.g., a back window), via which the cameras capture images, and which are cleaned via the wipers. Vehicle 1100 further includes one or more wipers (wiper 1 1142, ... wiper N 1144), each wiper being coupled to a wiper motor, and clearing one or more portions of a windshield when driven by the wiper motor, e.g. under control of the controller 1104 or processor 1102. Vehicle 1100 further includes engine/fuel/transmission components, e.g., a motor, internal combustion and/or electric, computer controlled fuel injection system, electronically controlled transmission, etc., which is coupled to speed control circuitry 1134. Vehicle 1100 further includes brake system components, e.g., ABS system, brake sensors, wheel motion sensors, wheel position sensors, actuators, hydraulic components, electronically controlled brakes, etc, coupled to braking control circuitry. Vehicle 1100 further includes steering system components 1140, e.g., rack and pinion unit, steering input controls and steering drive components including motors, etc., coupled to steering control circuitry. In some embodiments, the steering control circuitry 1134, braking control circuitry 1130 and/or steering control circuitry 1132 is part of an autonomous or semi-autonomous driving control system and/or an assisted driving control system.

Memory 1112 includes an assembly of software components 1150, e.g., an assembly of software routines or software modules, and data/information 1152. Data/information 1152 includes captured images (captured image 1 1154, ..., captured image Z 1156), a generated depth map 1158, e.g., generated from captured images just subsequent to windshield portion clearing via controlled wipers completing a sweep of portions of the windshield in front of a pair of cameras, and a generated vehicle control command 1160, e.g., to be sent to speed control circuitry 1134, braking control circuitry 1130 and/or steering control circuitry, e.g. in response to a detected change and/or problem, detected by analyzing the generated depth map, e.g., a pedestrian suddenly is detected in front of the vehicle resulting in a control command for avoidance.

Vehicle 1100 is, e.g., vehicle 500 of FIG. 5, vehicle 600 of FIG. 6, vehicle 700 of FIG. 7, a vehicle implementing the method of flowchart 300 of FIG. 3, a vehicle implementing the method of flowchart 400 of FIG. 4 and/or a vehicle implementing novel methods and/or apparatus described in this application and/or shown in any of the Figures. Vehicle 1100 is, e.g., any of: a land vehicle, e.g., a car, truck, motorcycle, bicycle, train, unmanned terrestrial vehicle, etc., a sea or water vehicle, e.g., boat, ship, unmanned water vehicle, etc., amphibious vehicle, air vehicle, e.g., airplane, helicopter, glider, unmanned aerial vehicle, etc.

Figure 12A:
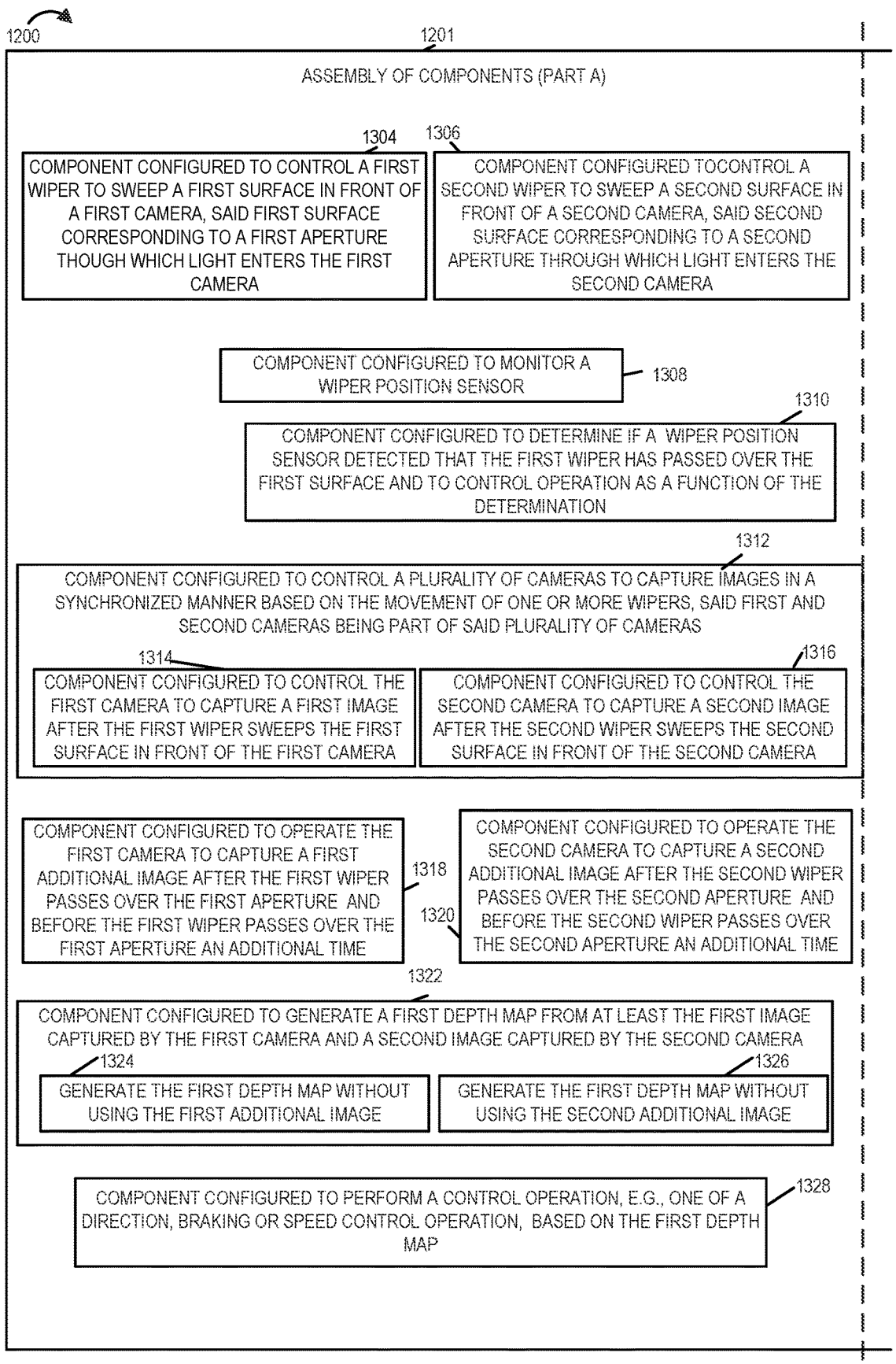
FIG. 12A is a first part of an assembly of components which may be included in a exemplary vehicle in accordance with an exemplary embodiment.
Figure 12B:
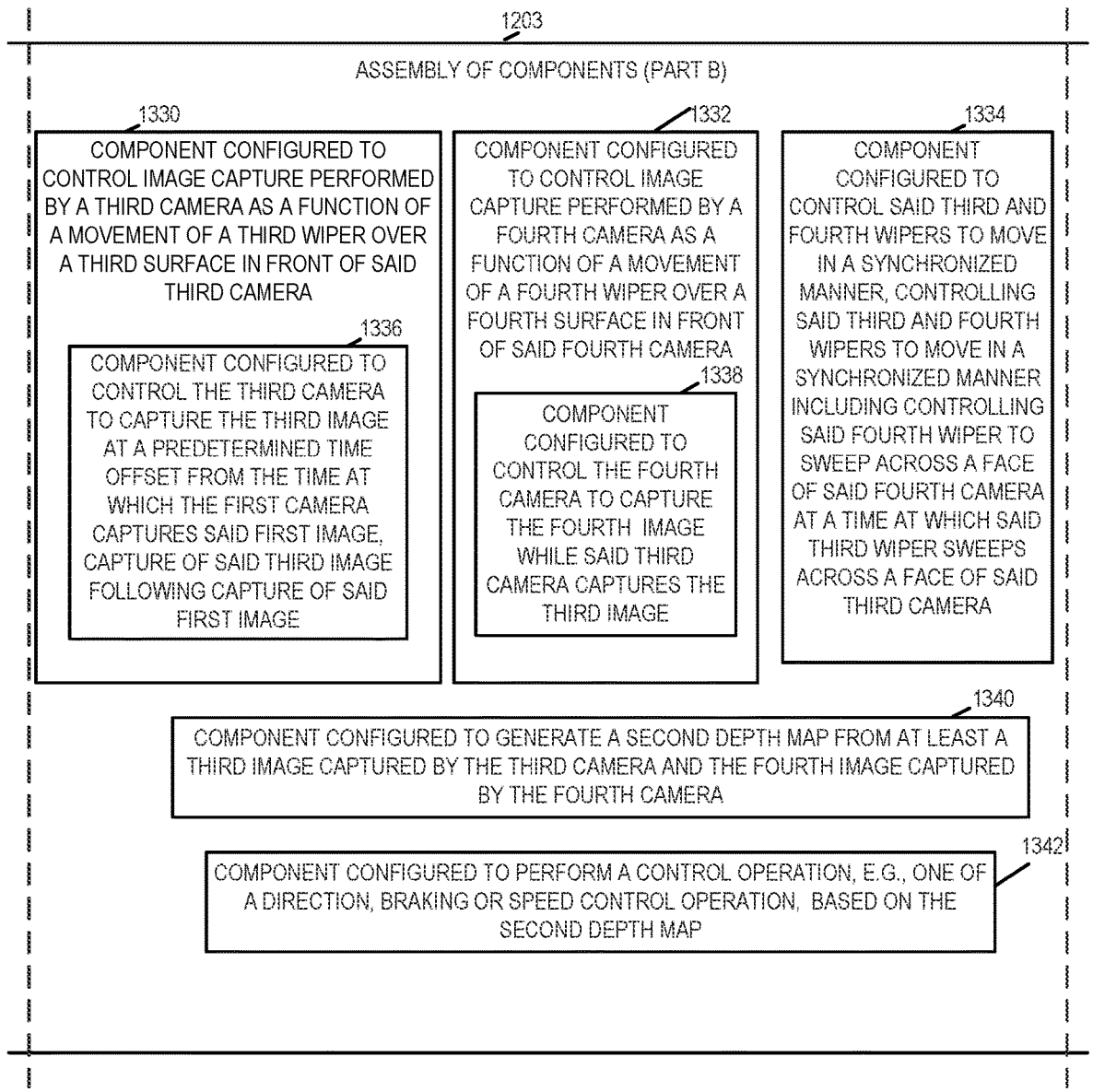
FIG. 12B is a second part of an assembly of components which may be included in a exemplary vehicle in accordance with an exemplary embodiment.

FIG. 12, comprising the combination of FIG. 12A, FIG. 12B and FIG. 12C is a drawing of an exemplary assembly of components 1200, comprising Part A 1201, Part B 1203 and Part C 1205, in accordance with an exemplary embodiment. Exemplary assembly of components may be, and sometimes is, included in one or more of vehicle 500 of FIG. 5, vehicle 600 of FIG. 6, vehicle 700 of FIG. 7 and/or vehicle 800 of FIG. 8.

The components in the assembly of components 1200 can, and in some embodiments are, implemented fully in hardware within the processor 1102, e.g., as individual circuits. The components in the assembly of components 1200 can, and in some embodiments are, implemented fully in hardware within the controller 1104, e.g., as individual circuits. The components in the assembly of components 1200 can, and in some embodiments are, implemented fully in hardware within the assembly of components 1110, e.g., as individual circuits corresponding to the different components. In other embodiments some of the components are implemented, e.g., as circuits, within the processor 1102 with other components being implemented, e.g., as circuits within assembly of components 1110, external to and coupled to the processor 1102. In some other embodiments some of the components are implemented, e.g., as circuits, within the processor 1102, with other components being implemented, e.g., as circuits, within controller 1104 and/or with other components being implemented, e.g., as circuits within assembly of components 1110, external to and coupled to the processor 1102. As should be appreciated the level of integration of components on the processor, controller and/or with some components being external to the processor or controller may be one of design choice. Alternatively, rather than being implemented as circuits, all or some of the components may be implemented in software and stored in the memory 1112 of the vehicle 1100 with the components controlling operation of the vehicle to implement the functions corresponding to the components when the components are executed by a processor, e.g., processor 1102. In some such embodiments, the assembly of components 1200 is included in the memory 1112 as assembly of software components 1150. In still other embodiments, various components in assembly of components 1200 are implemented as a combination of hardware and software, e.g., with another circuit external to the processor 1102 providing input to the processor 1102 which then under software control operates to perform a portion of a component's function. While processor 1102 is shown in the FIG. 11 embodiment as a single processor, e.g., computer, it should be appreciated that the processor 1102 may be implemented as one or more processors, e.g., computers.

When implemented in software the components include code, which when executed by the processor 1102, configure the processor 1102 to implement the function corresponding to the component. In embodiments where the assembly of components 1200 is stored in the memory 1112, the memory 1112 is a computer program product comprising a computer readable medium comprising code, e.g., individual code for each component, for causing at least one computer, e.g., processor 1102, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 12 control and/or configure the vehicle 1100, or elements therein such as the processor 1102 and/or controller 1104, to perform the functions of corresponding steps illustrated and/or described in the method of one or more of the flowcharts, signaling diagrams and/or described with respect to any of the Figures. Thus the assembly of components 1200 includes various components that perform functions of corresponding one or more described and/or illustrated steps of an exemplary method, e.g., steps of the method of flowchart 300 of FIG. 3, the flowchart 400 of FIG. 4 and/or described or shown with respect to any of the other figures.

Assembly of components 1200 includes a component 1304 configured to control a first wiper to sweep a first surface in front of a first camera, said first surface corresponding to a first aperture through which light enters the first camera, a component 1306 configured to control a second wiper to sweep a second surface in front of a second camera, said second surface corresponding to a second aperture through which light enters the second camera, a component 1308 configured to monitor a wiper position sensor, and a component 1310 configured to determine if a wiper position sensor detected that the first wiper has passed over the first surface and to control operation as a function of the determination. Assembly of components 1200 further includes a component 1312 configured to control a plurality of cameras to capture images in a synchronized manner based on the movement of one or more wipers, said first and second cameras being part of said plurality of cameras. Component 1312 includes a component 1314 configured to control the first camera to capture a first image after the first wiper sweeps the first surface in front of the first camera, and a component 1316 configured to control the second camera to capture a second image after the second wiper sweeps the second surface in front of the second camera. Assembly of components 1200 further includes a component 1318 configured to operate the first camera to capture a first additional image after the first wiper passes over the first aperture and before the first wiper passes over the first aperture an additional time, and a component 1320 configured to operate the second camera to capture a second additional image after the second wiper passes over the second aperture and before the second wiper passes over the second aperture an additional time. Assembly of components 1200 further includes a component 1322 configured to generate a first depth map from at least the first image captured by the first camera and the second image captured by the second camera. In some embodiment, component 1322 includes one or both of: a component 1324 configured to generate the first depth map without using the first additional image and a component 1326 configured to generate the first depth map without using the second additional image. Assembly of components 1200 further includes a component 1328 configured to perform a control operation, e.g., a vehicle control operation, e.g., one of a direction, braking or speed control operation, based on the first depth map, e.g. the first depth map generated by component 1322.

Assembly of component 1200 further includes a component 1330 configured to control image capture performed by a third camera as a function of a movement of a third wiper over a third surface in front of said third camera, a component 1322 configured to control image capture performed by a fourth camera as a function of a movement of a fourth wiper over a fourth surface in front of said fourth camera, and a component 1334 configured to control said third and fourth wipers to move in a synchronized manner, controlling said third and fourth wipers to move in a synchronized manner including controlling said fourth wiper to sweep across a face of said fourth camera at a time at which said third camera sweeps across a face of said third camera. In some embodiments component 1330 includes a component 1336 configured to control the third camera to capture the third image at a predetermined time offset from the time at which the first camera captures said first image, capture of said third image following capture of said first image. In some embodiments, component 1332 includes a component 1332 configured to control the fourth camera to capture the fourth image while said third camera captures said third image. Assembly of components 1200 further includes a component 1340 configured to generate a second depth map from at least a third image captured by the third camera and the fourth image captured by the fourth camera, and a component 1342 configured to perform a control operation, e.g., a vehicle control operation, e.g. one of a direction, braking or speed control operation, based on the second depth map.

Assembly of components 1200 further includes a component 1404 configured to control a first wiper to sweep a first surface in front of a first camera, said first surface corresponding to a first aperture through which light enters the first camera, a component 1406 configured to control the first camera to capture a first image after the first wiper sweeps the first surface in front of the first camera, a component 1408 configured to control the first wiper to sweep a second surface in front of a second camera, said second surface corresponding to a second aperture through which light enters the second camera, a component 1410 configured to control the second camera to initiate captured of a second image after the first wiper sweeps the second surface in front of the second camera, capture of the second image being initiated after capture of the first image by the first camera is initiated, a component 1412 configured to control the first wiper to sweep a third surface in front of a third camera, said third surface corresponding to a third aperture through which light enters the third camera, and a component 1414 configured to control the third camera to initiate captured of a third image after the first wiper sweeps the third surface in front of the second camera, capture of the third image being initiated after capture of the second image by the second camera is initiated. Assembly of components 1200 further includes a component 1416 configured to generate a first depth map from at the first image captured by the first camera and the second image captured by the second camera. In some embodiments, component 1416 includes a component 1418 configured to give greater weight to content in said first image than content in said second image when generating said first depth map. In some embodiments component 1416 includes a component 1420 configured to generate said first depth map from the first image captured by the first camera, the second image captured by the second camera and the third image captured by the third camera. In some embodiments component 1420 includes a component 1422 configured to give greater weight to content in said first image than content in said second image and give greater weight to content in said second image than content in said third image when generating said first depth map. Assembly of components 1200 further includes a component 1424 configured to perform a control operation, e.g., a vehicle control operation, e.g., one of a direction, braking or speed control operation, based on the first depth map, e.g. the first depth map generated by component 1416.

Figure 13:
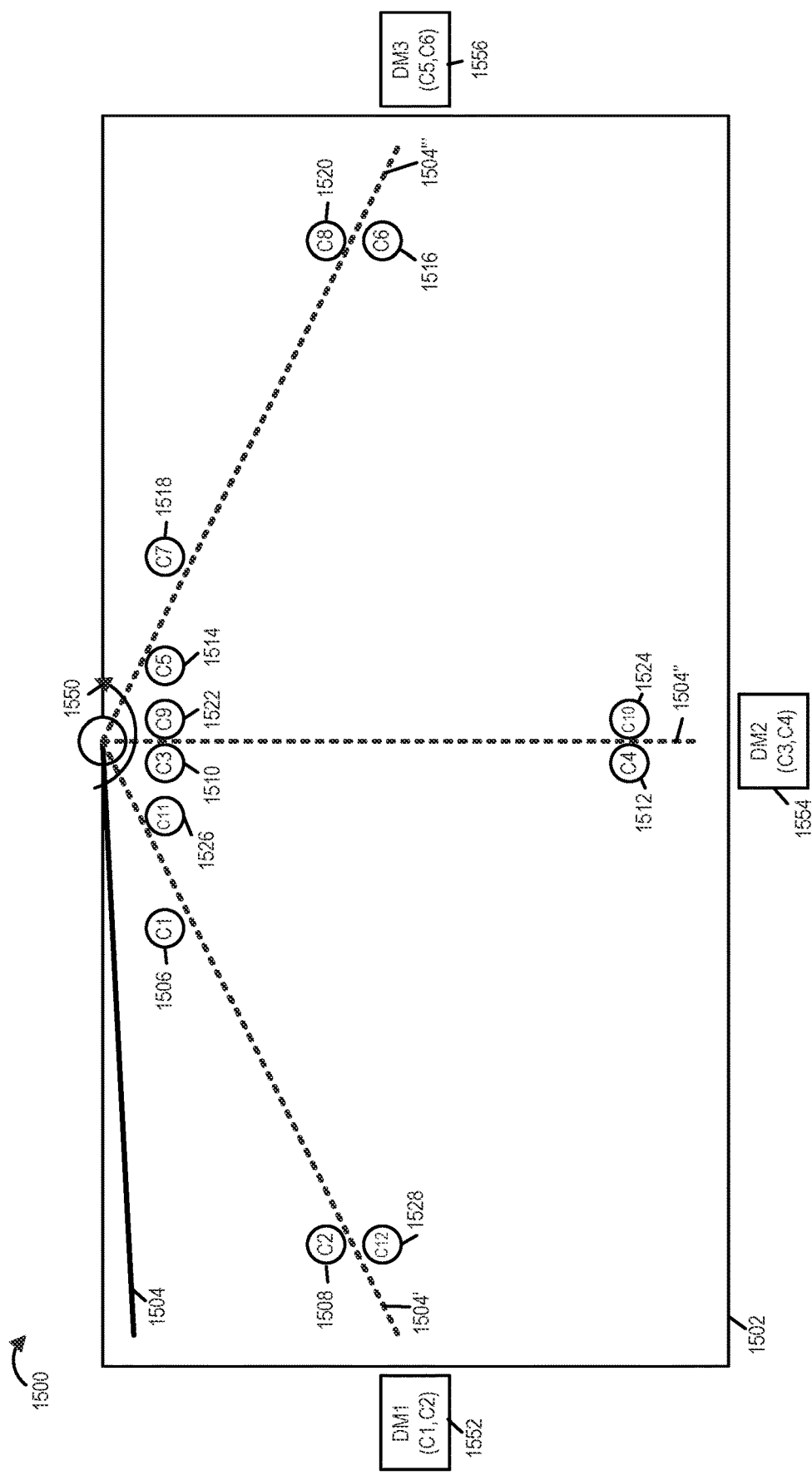
FIG. 13 illustrates a first part an example for an exemplary embodiment in which a single wiper sweeps a windshield, and different sets of cameras, e.g., different pairs of cameras, corresponding to recently cleared windshield portions, are used at different times to capture images used to generate a depth map.

FIGS. 13-14 are used to illustrate an exemplary embodiment in which a single wiper sweeps a windshield, and different sets of cameras, e.g., different pairs of cameras, corresponding to recently cleared windshield portions, are used at different times to capture images used to generate a depth map. Drawing 1500 of FIG. 13 illustrates an exemplary windshield 1502, an exemplary wiper 1504, used to clear the windshield 1502, and an exemplary cameras (camera C1 1506, camera C2 1508, camera C3 1510, camera C4 1512, camera C5 1514, camera C6 1516, camera C7 1518, camera C8 1520, camera C9 1522, camera C10 1524, camera C11 1526, and camera C12 1528) which capture images through the windshield 1502.

Arrow 1550 indicates a first direction of rotation of the wiper 1504. Dotted line 1504' indicates the location of wiper 1504 at a time in which the wiper 1504 has just swept across and cleared the windshield areas in front of cameras C1 1506 and C2 1508. Camera C1 1506 and camera C2 1508 each capture an image. Box 1552 indicates that depth map 1 (DM1) is generated based on the captured image from camera C1 1506 and the captured image from camera C2 1508.

Wiper 1504 proceeds to rotate in direction 1550. Dotted line 1504" indicates the location of wiper 1504 at a time in which the wiper 1504 has just swept across and cleared the windshield areas in front of cameras C3 1510 and C4 1512. Camera C3 1510 and camera C4 1512 each capture an image. Box 1554 indicates that depth map 2 (DM2) is generated based on the captured image from camera C3 1510 and the captured image from camera C4 1512.

Wiper 1504 proceeds to rotate in direction 1550. Dotted line 1504''' indicates the location of wiper 1504 at a time in which the wiper 1504 has just swept across and cleared the windshield areas in front of cameras C5 1514 and C6 1516. Camera C5 1514 and camera C6 1516 each capture an image. Box 1556 indicates that depth map 3 (DM3) is generated based on the captured image from camera C5 1514 and the captured image from camera C6 1516.

Drawing 1600 of FIG. 14, is a continuation of the example of FIG. 13, and illustrates the exemplary windshield 1502, the exemplary wiper 1504, used to clear the windshield 1502, and the exemplary cameras (camera C1 1506, camera C2 1508, camera C3 1510, camera C4 1512, camera C5 1514, camera C6 1516, camera C7 1518, camera C8 1520, camera C9 1522, camera C10 1524, camera C11 1526, and camera C12 1528) which capture images through the windshield 1502.

Arrow 1650 indicates a second direction of rotation of the wiper 1504. Dotted line 1504'''' indicates the location of wiper 1504 at a time in which the wiper 1504 has just swept across and cleared the windshield areas in front of cameras C7 1518 and C8 1520. Camera C7 1518 and camera C8 1520 each capture an image. Box 1652 indicates that depth map 4 (DM4) is generated based on the captured image from camera C7 1518 and the captured image from camera C8 1520.

Wiper 1504 proceeds to rotate in direction 1650. Dotted line 1504''''' indicates the location of wiper 1504 at a time in which the wiper 1504 has just swept across and cleared the windshield areas in front of cameras C9 1522 and C10 1524. Camera C9 1522 and camera C10 1524 each capture an image. Box 1654 indicates that depth map 5 (DM5) is generated based on the captured image from camera C9 1522 and the captured image from camera C10 1524.

Wiper 1504 proceeds to rotate in direction 1650. Dotted line 1504'''''' indicates the location of wiper 1504 at a time in which the wiper 1504 has just swept across and cleared the windshield areas in front of cameras C11 1526 and C12 1528. Camera C11 1526 and camera C12 1528 each capture an image. Box 1656 indicates that depth map 6 (DM6) is generated based on the captured image from camera C11 1526 and the captured image from camera C12 1528.

The example of FIGS. 13-14 uses captured images from two cameras, e.g., two cameras along a line, each camera in the pair corresponding to an area of the windshield that is cleared by the wiper at the same time or substantially the same time, to generate a depth map. At different times, different pairs of cameras are used to generate the depth map. In some other embodiments, there are more than 2 cameras, e.g., 3, 4 or more cameras, along a line in which the windshield is cleared concurrently, and the set of cameras along that line is used to generate a depth map, e.g., based on captured image following the wiper clearing the area in front of the cameras.

Figure 15A:
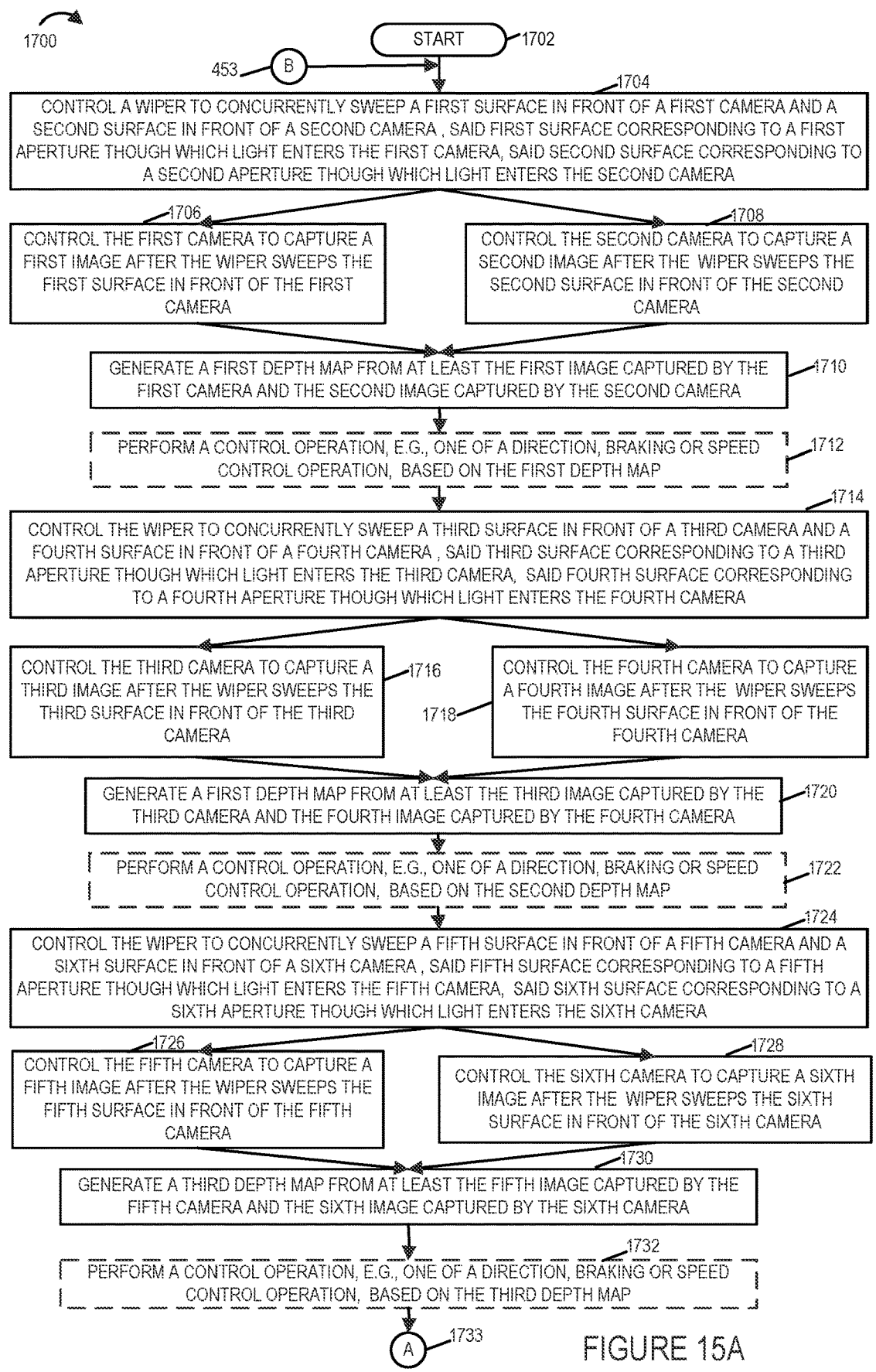
FIG. 15A is a first part of a flowchart of an exemplary method of operating cameras and a wiper in a coordinated manner in accordance with an exemplary embodiment.

FIG. 15, comprising the combination of FIG. 15A and FIG. 15B, is a flowchart 1700 of an exemplary method of operating cameras and a wiper, e.g., the cameras and wiper of FIGS. 13-14, in a coordinated manner in accordance with an exemplary embodiment. In some embodiments, the exemplary method of flowchart 1700 of FIG. 15 is performed by a vehicle including a processor and memory.

Operation starts in step 1702 and proceeds to step 1704. In step 1704 a wiper is controlled to concurrently sweep a first surface in front of a first camera and a second surface in front of a second camera, said first surface corresponding to a first aperture through which light enters the first camera, said second surface corresponding to a second aperture through which light enters the second camera. Operation proceeds from step 1704 to step 1706 and 1708, which may be performed in parallel.

In step 1706 the first camera is controlled to capture a first image after the wiper sweeps the first surface in front of the first camera. In step 1708 the second camera is controlled to capture a second image after the wiper sweeps the second surface in front of the second camera. Operation proceeds from step 1706 and 1708 to step 1710.

In step 1710 a first depth map is generated from at least the first image captured by the first camera and the second image captured by the second camera. Operation proceeds from step 1710 to step 1712. In step 1712 a control operation, e.g. a vehicle control operation, e.g., one of a direction, braking or speed control operation is performed based on the first depth map. Operation proceeds from step 1712 to step 1714.

In step 1714 the wiper is controlled to concurrently sweep a third surface in front of a third camera and a fourth surface in front of a fourth camera, said third surface corresponding to a third aperture through which light enters the third camera, said fourth surface corresponding to a fourth aperture through which light enters the fourth camera. Operation proceeds from step 1714 to step 1716 and 1718, which may be performed in parallel.

In step 1716 the third camera is controlled to capture a third image after the wiper sweeps the third surface in front of the third camera. In step 1718 the fourth camera is controlled to capture a fourth image after the wiper sweeps the fourth surface in front of the fourth camera. Operation proceeds from step 1716 and 1718 to step 1720.

In step 1720 a second depth map is generated from at least the third image captured by the third camera and the fourth image captured by the fourth camera. Operation proceeds from step 1720 to step 1722. In step 1722 a control operation, e.g. a vehicle control operation, e.g., one of a direction, braking or speed control operation is performed based on the second depth map. Operation proceeds from step 1722 to step 1724.

In step 1724 the wiper is controlled to concurrently sweep a fifth surface in front of a fifth camera and a sixth surface in front of a sixth camera, said fifth surface corresponding to a fifth aperture through which light enters the fifth camera, said sixth surface corresponding to a sixth aperture through which light enters the sixth camera. Operation proceeds from step 1724 to step 1726 and 1728, which may be performed in parallel.

In step 1726 the fifth camera is controlled to capture a fifth image after the wiper sweeps the fifth surface in front of the fifth camera. In step 1728 the sixth camera is controlled to capture a sixth image after the wiper sweeps the sixth surface in front of the sixth camera. Operation proceeds from step 1726 and 1728 to step 1730.

In step 1730 a third depth map is generated from at least the fifth image captured by the fifth camera and the sixth image captured by the sixth camera. Operation proceeds from step 1730 to step 1732. In step 1732 a control operation, e.g. a vehicle control operation, e.g., one of a direction, braking or speed control operation is performed based on the third depth map. Operation proceeds from step 1732, via connecting node A 1733 to step 1734.

In step 1734 the wiper is controlled to concurrently sweep a seventh surface in front of a seventh camera and an eighth surface in front of a eighth camera, said seventh surface corresponding to a seventh aperture through which light enters the seventh camera, said eighth surface corresponding to an eighth aperture through which light enters the eighth camera. Operation proceeds from step 1734 to step 1736 and 1738, which may be performed in parallel.

In step 1736 the seventh camera is controlled to capture a seventh image after the wiper sweeps the seventh surface in front of the seventh camera. In step 1738 the eighth camera is controlled to capture an eighth image after the wiper sweeps the eighth surface in front of the eighth camera. Operation proceeds from step 1736 and 1738 to step 1740.

In step 1740 a fourth depth map is generated from at least the seventh image captured by the seventh camera and the eighth image captured by the eighth camera. Operation proceeds from step 1740 to step 1742. In step 1742 a control operation, e.g. a vehicle control operation, e.g., one of a direction, braking or speed control operation is performed based on the fourth depth map. Operation proceeds from step 1742 to step 1744.

In step 1744 the wiper is controlled to concurrently sweep a ninth surface in front of a ninth camera and a tenth surface in front of a tenth camera, said ninth surface corresponding to a ninth aperture through which light enters the ninth camera, said tenth surface corresponding to an tenth aperture through which light enters the tenth camera. Operation proceeds from step 1744 to step 1746 and 1748, which may be performed in parallel.

In step 1746 the ninth camera is controlled to capture a ninth image after the wiper sweeps the ninth surface in front of the ninth camera. In step 1748 the tenth camera is controlled to capture a tenth image after the wiper sweeps the tenth surface in front of the tenth camera. Operation proceeds from step 1746 and 1748 to step 1750.

In step 1750 a fifth depth map is generated from at least the ninth image captured by the ninth camera and the tenth image captured by the tenth camera. Operation proceeds from step 1750 to step 1752. In step 1752 a control operation, e.g. a vehicle control operation, e.g., one of a direction, braking or speed control operation is performed based on the fifth depth map. Operation proceeds from step 1752 to step 1754.

In step 1754 the wiper is controlled to concurrently sweep an eleventh surface in front of an eleventh camera and a twelfth surface in front of a twelfth camera, said eleventh surface corresponding to a eleventh aperture through which light enters the eleventh camera, said twelfth surface corresponding to an twelfth aperture through which light enters the twelfth camera. Operation proceeds from step 1754 to step 1756 and 1758, which may be performed in parallel.

In step 1756 the eleventh camera is controlled to capture an eleventh image after the wiper sweeps the eleventh surface in front of the eleventh camera. In step 1758 the twelfth camera is controlled to capture a twelfth image after the wiper sweeps the twelfth surface in front of the twelfth camera. Operation proceeds from step 1756 and 1758 to step 1760.

In step 1760 a sixth depth map is generated from at least the eleventh image captured by the eleventh camera and the twelfth image captured by the twelfth camera. Operation proceeds from step 1760 to step 1762. In step 1762 a control operation, e.g. a vehicle control operation, e.g., one of a direction, braking or speed control operation is performed based on the sixth depth map. Operation proceeds from step 1762, via connecting node B 1762 to step 1704.

Various aspects and/or features of some embodiments of the present inventions are discussed below. For depth estimation with stereo or multiple cameras, it is important to synchronize the capture times across cameras. In fact, to overcome the effects of scene and camera motion (esp. severe in autonomous driving scenarios), it is desired that the images from the cameras involved in depth estimation be taken in as overlapping time windows as possible. For global shutter, one could synchronize capture times per frame. With rolling shutter, one needs to take line-times into account for capture time synchronization. In other words, the goal is to capture the exact same scene in time from the different cameras.

Differences in the captured images will naturally arise, primarily from the scene+camera geometry as well inherent device-dependent differences (e.g. lens distortions, aberrations), some of which can calibrated out. However, external factors, such as the presence of water, dirt, or any contamination on the lens or the module housing, will introduce discrepancies of their own.

Dealing with rain is especially challenging as water remaining on the lens (or any housing) will directly lead to variation in the optics of the cameras—across cameras at any given instance and across time for any given camera. For cars, cameras can be mounted right behind the windshield—which also helps in defocusing any contamination on the windshield. Given this, and considering one camera only, one can try to combat the effects of rain by grabbing frames that are taken right after any water present has been removed by means of a wiper or at least giving such frames more weight in any computation as compared to the rest.

In various embodiments the method involves: (i) synchronizing frames across cameras; and/or (ii) treating frames obtained immediately after or within a short time of the sweep of a wiper rather than images captured at greater times from the sweeping of the image capture area by a wiper.

In various embodiments a controller synchronizes the operation of two or more wipers with the images, e.g., frames captured by the cameras behind the wipers being used for depth map generation purposes. In some embodiments involving a vehicle, e.g., a car, two cameras are used, one located near the top-left and the other near the top-right of the front windshield of the car. The system controls the two wipers, e.g., the left wiper affecting the top-left and the right wiper affecting, e.g., sweeping, the top-right of the windshield, so that they cross the field of view of the left and right cameras, respectively, in a synchronized manner, e.g., so that they pass the apertures of the respective cameras, at the same or close time instants. The two cameras are operated to capture frames in a synchronized manner, with both cameras image capture being triggered by an image capture signal sent to both the left and right cameras so that they operate in parallel with regard to image capture.

The method is extended in some embodiments to the control of sets of right and left cameras. In the system with two wipers, a left and right wiper, an assembly of a left set of N cameras is affected by the left wiper and the another set, e.g., a right set of N cameras is affected by the right wiper, were N can be an integer 1 or larger and often 2, 3, 4, or 5. With one-to-one correspondence between the cameras in the two sets of N cameras in terms of image capture control, the cameras in each set are controlled to sequentially capture images, e.g., frames at sequential time instances which are based on the passage of a wiper over the area in front of the cameras in the set of N cameras on the left and right. In such a case the left wiper will pass over the area in front of the first camera in the left set of N cameras while the right wiper will pass over the area in front of the first camera in the right side set of N cameras and so on. In such a case there will be synchronization in terms of the time and order in which the area in front of the cameras in the left and right camera sets is cleared. The methods are not limited to two sets of N cameras, but are extended, in some embodiments, to M sets of N cameras, where M and N are both integers greater than 1, 2 or 3 in at least some embodiments. M and N can be, and sometimes are, different with M often being less than N in cases where a large number of cameras are used in each of the sets of N cameras.

Maintaining synchronization in a mechanical system such as one constituting multiple wipers can be more difficult than maintaining frame sync between multiple cameras. However, synchronized frames from cameras, in which the wipers crossing the field-of-view themselves have been captured, could be, and in some embodiments, is used to track the phase of operation of individual wipers and his information can be, and in some embodiments is, used to keep the phases of the wipers locked with each other.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

While various figures show different exemplary methods, it should be appreciated that any of the methods can be implemented using the system, apparatus and/or components shown in any of the other figures in this application which include one or more components required to implement the illustrated method.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images may be and sometimes are displayed on the display included in the vehicle or device on which the image capture system with one or more wipers is incorporated.

EXEMPLARY NUMBERED METHOD EMBODIMENTS

Method Embodiment 1. A method comprising: controlling (304 or 404) a first wiper to sweep a first surface in front of a first camera; controlling (314 or 406) the first camera to capture a first image after the first wiper sweeps the first surface in front of the first camera; and generating (322 or 416) a first depth map from at least the first image captured by the first camera and a second image captured by a second camera.

Method Embodiment 2. The method of Method Embodiment 1, wherein said first and second cameras are mounted on a vehicle.

Method Embodiment 3. The method of Method Embodiment 2, further comprising: controlling (306) a second wiper to sweep a second surface in front of a second camera; controlling (316) the second camera to capture the second image after the second wiper sweeps a second surface in front of the second camera.

Method Embodiment 3A. The method of Method Embodiment 3, wherein said first and second surfaces are portions of a single piece of glass (e.g., a windshield).

Method Embodiment 3B. The method of Method Embodiment 3, wherein said first surface corresponds to a first aperture through which light enters the first camera and the second surface corresponds to a second aperture through which light enters the second camera.

Method Embodiment 4. The method of Method Embodiment 3, further comprising: controlling (312) a plurality of cameras to capture images in a synchronized manner based on movement of one or more wipers, said first and second cameras being part of said plurality of cameras.

Method Embodiment 5. The method of Method Embodiment 4, wherein controlling (316) the first camera to capture the first image and controlling (318) the second camera to capture the second image is performed as part of a step of controlling (312) the plurality of cameras to capture images in a synchronized manner based on movement of one or more wipers, said first and second cameras being controlled to capture the first and second images at the same time.

Method Embodiment 6. The method of Method Embodiment 5, further comprising: monitoring (308) a wiper position sensor; and wherein controlling (314) the first camera to capture the first image and controlling (316) the second camera to capture the second image is performed in response to detection (310) by the wiper position sensor that the first wiper has passed over the first surface.

Method Embodiment 7. The method of Method Embodiment 6, wherein said first and second images include at least one image captured immediately after the first wiper passes in front of said first camera and prior to the first wiper changing the direction of first wiper movement (e.g., before the wiper reaches its maximum movement in a given direction and begins to sweep back in the return direction).

Method Embodiment 7A. The method of Method Embodiment 5, controlling (330) image capture performed by a third camera as a function of movement of a third wiper over a third surface in front of said third camera; controlling (332) image capture performed by a fourth camera as a function of movement of a fourth wiper over a fourth surface in front of said fourth camera; and generating (340) a second depth map from at least a third image captured by the third camera and at least a fourth image captured by the fourth camera.

Method Embodiment 7B. The method of Method Embodiment 7A, wherein controlling (332) image capture performed by the fourth camera includes controlling (338) the fourth camera to capture the fourth image while said third camera captures the third image.

Method Embodiment 8. The method of Method Embodiment 7B, wherein controlling (330) image capture performed by the third camera includes controlling (336) the third camera to capture the third image at a predetermined time offset from the time at which the first camera captures said first image, capture of said third image following capture of said first image.

Method Embodiment 9. The method of Method Embodiment 8, wherein the first and second cameras are spaced apart from one another by a first fixed distance; wherein said third and fourth cameras are spaced apart from one another by a second fixed distance, said second fixed distance being the same or different from said first fixed distance; and wherein said third and fourth cameras have overlapping fields of view.

Method Embodiment 10. The method of Method Embodiment 3, further comprising: controlling (334) said third and fourth wipers to move in a synchronized manner, controlling said third and fourth wipers including controlling said fourth wiper to sweep across a face of said fourth camera at a time at which said third wiper sweeps across a face of said third camera.

Method Embodiment 11. The method of Method Embodiment 10, wherein said third and fourth cameras are part of a second camera pair mounted inside said vehicle; wherein said third surface in front of said third camera is a third portion of said windshield; wherein said fourth surface in front of said fourth camera is a fourth portion of said windshield.

In some embodiments one or more images which are captured far away, e.g., in time, from the time the wiper swept over the first camera are not used and images closest to when the wiper sweep over the first area occurred are used in generating the depth map.

Method Embodiment 8A. The method of Method Embodiment 7, further comprising: operating (318) the first camera to capture a first additional image after the wiper passes over the first aperture and before the wiper passes over the first aperture an additional time; and wherein generating (322) the first depth map from at least the first image captured by the first camera and the second image captured by a second camera further includes (324) not using said first additional image when generating said depth map.

Method Embodiment 9A. The method of Method Embodiment 7, further comprising: performing (328) a control operation based on said first depth map.

Method Embodiment 10A. The method of Method Embodiment 9A, wherein said control operation is a vehicle control operation, said vehicle control operation being one of a direction, braking or speed control operation Method Embodiment 12. The method of Method Embodiment 1, further comprising: controlling (410) the second camera to initiate capture of the second image after the first wiper sweeps a second surface in front of the second camera (e.g., at the same time as the first image is captured by the first camera or after the capture of the first image but near in time to when the wiper swept past the second surface cleaning the surface in front of the second camera).

Method Embodiment 13. The method of Method Embodiment 12, wherein generating (416) the first depth map from at least the first image captured by the first camera and the second image captured by a second camera includes giving (418) greater weight to content in said second image than content in said first image when generating said first depth map (e.g., because the second image with less time for dirt to accumulate since the most recent cleaning than there was time for dirt to accumulate on the first surface).

Method Embodiment 13A. The method of Method Embodiment 13, wherein said first and second images are captured at the same time, said second surface having been cleaned by said wiper more recently in time to the time the first and second images are captured than the time at which said wiper cleaned the first surface in front of said first camera.

Method Embodiment 14. The method of Method Embodiment 13, further comprising controlling (414) a third camera to initiate capture of a third image after the first wiper sweeps a third surface in front of the third camera, capture of the third image being performed in parallel (e.g., at the same time) with capture of the first and second images by the first and second cameras, respectively, the third surface in front of said third camera having been cleaned closest in time to the time at which said first, second and third images are captured.

EXEMPLARY NUMBERED SYSTEM EMBODIMENTS

System Embodiment 1. A system comprising: a first camera; a second camera; a wiper; and a processor configured to: control (304 or 404) a first wiper to sweep a first surface in front of the first camera; control (314 or 406) the first camera to capture a first image after the first wiper sweeps the first surface in front of the first camera; and generate (322 or 416) a first depth map from at least the first image captured by the first camera and a second image captured by the second camera.

System Embodiment 2. The system of System Embodiment 1, wherein said first and second cameras are mounted on a vehicle.

System Embodiment 3. The system of System Embodiment 2, wherein the processor is further configured to: control (306) a second wiper to sweep a second surface in front of a second camera; control (316) the second camera to capture the second image after the second wiper sweeps a second surface in front of the second camera.

System Embodiment 3A. The system of System Embodiment 3, wherein said first and second surfaces are portions of a single piece of glass (e.g., a windshield).

System Embodiment 3B. The system of System Embodiment 3, wherein said first surface corresponds to a first aperture through which light enters the first camera and the second surface corresponds to a second aperture through which light enters the second camera.

System Embodiment 4. The system of System Embodiment 3, wherein the processor is further configured to: control (312) a plurality of cameras to capture images in a synchronized manner based on movement of one or more wipers, said first and second cameras being part of said plurality of cameras, said plurality of cameras including the first camera and the second camera.

System Embodiment 5. The system of System Embodiment 4, wherein the processor is configure to control (316) the first camera to capture the first image and control (318) the second camera to capture the second image as part of a step of controlling (312) the plurality of cameras to capture images in a synchronized manner based on movement of one or more wipers, said first and second cameras being controlled to capture the first and second images at the same time.

System Embodiment 6. The system of System Embodiment 5, further comprising: a wiper position sensor; and wherein the processor is further configured to: monitor (308) the wiper position sensor to determine wiper position; and wherein controlling (314) the first camera to capture the first image and controlling (316) the second camera to capture the second image is performed by the processor in response to detection (310) by the wiper position sensor that the first wiper has passed over the first surface.

System Embodiment 7. The system of System Embodiment 6, wherein said first and second images include at least one image captured immediately after the first wiper passes in front of said first camera and prior to the first wiper changing the direction of first wiper movement (e.g., before the wiper reaches its maximum movement in a given direction and begins to sweep back in the return direction).

System Embodiment 7A. The system of System Embodiment 5, further comprising: a third camera; a third wiper; a fourth camera; and a fourth wiper; and wherein the processor is further configured to: control (330) image capture performed by the third camera as a function of movement of the third wiper over a third surface in front of said third camera; control (332) image capture performed by the fourth camera as a function of movement of the fourth wiper over a fourth surface in front of said fourth camera; and generate (340) a second depth map from at least a third image captured by the third camera and at least a fourth image captured by the fourth camera.

System Embodiment 7B. The system of System Embodiment 7A, wherein controlling (332) image capture performed by the fourth camera includes controlling (338) the fourth camera to capture the fourth image while said third camera captures the third image.

System Embodiment 8. The system of System Embodiment 7B, wherein controlling (330) image capture performed by the third camera includes controlling (336) the third camera to capture the third image at a predetermined time offset from the time at which the first camera captures said first image, capture of said third image following capture of said first image.

System Embodiment 9. The system of System Embodiment 8, wherein the first and second cameras are spaced apart from one another by a first fixed distance; wherein said third and fourth cameras are spaced apart from one another by a second fixed distance, said second fixed distance being the same or different from said first fixed distance; and wherein said third and fourth cameras have overlapping fields of view.

System Embodiment 10. The system of System Embodiment 1, further comprising: a third camera; a third wiper; a fourth camera; and a fourth wiper; and wherein the processor is further configured to control (334) said third and fourth wipers to move in a synchronized manner, controlling said third and fourth wipers including controlling said fourth wiper to sweep across a face of said fourth camera at a time at which said third wiper sweeps across a face of said third camera.

System Embodiment 11. The system of System Embodiment 10, wherein said third and fourth cameras are part of a second camera pair mounted inside said vehicle; wherein said third surface in front of said third camera is a third portion of said windshield; wherein said fourth surface in front of said fourth camera is a fourth portion of said windshield.

System Embodiment 8A. The system of System Embodiment 7, wherein the processor is further configured to: operate (318) the first camera to capture a first additional image after the wiper passes over the first aperture and before the wiper passes over the first aperture an additional time; and wherein generating (322) the first depth map from at least the first image captured by the first camera and the second image captured by a second camera further includes (324) not using said first additional image when generating said depth map.

System Embodiment 9A. The system of System Embodiment 7, wherein the processor is further configured to: perform (328) a control operation based on said first depth map.

System Embodiment 10A. The system of System Embodiment 9A, wherein said control operation is a vehicle control operation, said vehicle control operation being one of a direction, braking or speed control operation.

System Embodiment 12. The system of System Embodiment 1, wherein the processor is further configured to: control (410) the second camera to initiate capture of the second image after the first wiper sweeps a second surface in front of the second camera (e.g., at the same time as the first image is captured by the first camera or after the capture of the first image but near in time to when the wiper swept past the second surface cleaning the surface in front of the second camera).

System Embodiment 13. The system of System Embodiment 12, wherein generating (416) the first depth map from at least the first image captured by the first camera and the second image captured by a second camera includes giving (418) greater weight to content in said second image than content in said first image when generating said first depth map (e.g., because the second image with less time for dirt to accumulate since the most recent cleaning than there was time for dirt to accumulate on the first surface).

System Embodiment 13A. The system of System Embodiment 13, wherein said first and second images are captured at the same time, said second surface having been cleaned by said wiper more recently in time to the time the first and second images are captured than the time at which said wiper cleaned the first surface in front of said first camera.

System Embodiment 14. The system of System Embodiment 13, wherein the processor is further configured to: control (414) a third camera to initiate capture of a third image after the first wiper sweeps a third surface in front of the third camera, capture of the third image being performed in parallel (e.g., at the same time) with capture of the first and second images by the first and second cameras, respectively, the third surface in front of said third camera having been cleaned closest in time to the time at which said first, second and third images are captured.

In some embodiments a single wiper sweeps over 2 or more cameras and the images corresponding to a camera are captured after the wiper cleans the surface in front of the camera with the possibility of the cameras capturing images in parallel or sequentially. In at least one embodiment the images are captured in parallel, e.g., at the same time using multiple cameras. The image captured by the most recently cleaned image area is given the highest weight when making depth determinations since it will be the most recent in time and thus most accurately reflect the current position of the vehicle. In some cases the images are captured at the same time. In other cases the images are captured by the first, second and third cameras sequentially. In either case the image captured by the third camera is given priority for depth determination purposes since it will correspond to the most recent image as well as the most recently cleaned image. Similarly the second image will be given lower weight, e.g. less influence, than the third image because it was cleaned further away in time from the image capture time and/or because it is older. The first image which will be the furthers away from the image capture time in the case of sequential image capture based on wiper cleaning order, from first through third surfaces, will be given the lowest priority and in the case of parallel image capture will be given the lowest priority because of the first surface area having been cleaned the furthest amount of time away from the image capture time allowing more dirt to accumulate on the first surface in front of the first camera than the third surface in front of the third camera.

In cases where the wiper reverses direction and passes over the surfaces in front of the cameras in the order of the third surface, the second surface and the first surface, the priority of images will be reversed for depth map generation purposes as the wiper sweeps in the refers direction. Thus for the reverse sweep of the wiper the first image captured by the first camera will be given highest priority, e.g, weight and influence, in generating a depth map from first, second and third images since it will be cleaned last and will be the closest in time to when the second set of first, second and third images are captured after the wiper passes over the first surface area for a second time, e.g., on a reverse sweep of the wiper. The second image will be given more weight than the third image which will be the furthest in time from when the wiper cleaned in front of the third camera assuming the second set of first, second and third images are captured after the wiper passes over the first surface as part of the reverse wiper sweep.

The order of steps is in various flow diagrams is intended to be exemplary and not limiting and to the extent that the steps can be performed in another order such other orders are contemplated and within the scope of this disclosure.

Numerous additional variations on the methods and apparatus of the present invention described above will be apparent to those skilled in the art in view of the above description of the invention. For example, while described in the context of a vehicle mounted system the methods and apparatus for using wipers in combination with multiple captures which are used to generate depth maps can be used for stationary applications as well where an area is monitored and depth information is used for security or control applications. In such cases as in the vehicle mounted embodiment giving greater weight and influence to images captured more recently to the point in time a wiper sweeps and cleans an area in front of a camera can improve reliability as compared to systems which do not take into consideration when a wiper sweeps in front of the surface, e.g., surface of a glass or lens, in front of the camera or cameras capturing the images used in generating environmental depth, e.g., distance, information.

The order in which steps are performed is exemplary and it should be appreciated that images can be captured at different times, e.g., sequentially by different cameras and/or at the same time, e.g., with multiple cameras being controlled to capture images at the same time.

Such variations are to be considered within the scope of the invention. In various embodiments the camera are implemented as digital cameras as part of a system that includes one or more wipers, receiver/transmitter circuits and logic and/or routines, for implementing the methods of the present invention and/or for transiting captured images or generated composite images or depth maps to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain, e.g., chain being fixed with, in at least some embodiments the covering being a windshield of a vehicle.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A method comprising:
    operating a processor or circuit to control a single wiper to perform a first wiper sweep, said single wiper passing over a first surface in front of a first camera and a second surface in front of a second camera at the same time while said the single wiper moves during said first wiper sweep;
    controlling the first and second cameras to capture images at the same time, controlling the first and second cameras to capture images at the same time including controlling the first camera to capture a first image and controlling the second camera to capture a second image while the first camera captures the first image, said first and second images being captured while said first wiper sweep is ongoing, said first image being captured after the single wiper sweeps the first surface in front of the first camera while the single wiper is moving; and
    generating a first depth map from at least the first image captured by the first camera and the second image captured by the second camera.

2. The method of claim 1,
    wherein said first and second cameras are mounted along the path of the single wiper such that the single wiper passes over the first and second surfaces at the same time.

3. The method of claim 1,
    wherein the single wiper is a straight wiper; and
    wherein said first and second cameras are positioned in a line with which said single wiper is aligned during a portion of the first wiper sweep.

4. The method of claim 1,
    wherein the first and second cameras are spaced apart by a first distance; and
    wherein the single wiper has a width which is less than said first distance and a length which is longer than said first distance.

5. The method of claim 1,
    wherein said first surface is a first part of a windshield, the first part being located in front of an aperture of the first camera, said single wiper being clear of said aperture of the first camera at the time said first image is captured; and
    wherein said second surface is a second part of the windshield, the second part being located in front of an aperture of the second camera.

6. The method of claim 5,
    wherein controlling the first camera to capture a first image and controlling the second camera to capture a second image are performed as part of a step of controlling a plurality of cameras to capture images in a synchronized manner based on movement of, said single wiper, said first and second cameras being part of said plurality of cameras.

7. The method of claim 6, further comprising:
    monitoring a wiper position sensor; and
    wherein controlling the first camera to capture the first image and controlling the second camera to capture the second image is performed in response to detection by the wiper position sensor that the single wiper has passed over the first surface.

8. The method of claim 7, wherein said first and second images include at least one image captured immediately after the single wiper passes in front of said first camera and prior to the single wiper changing a direction of first wiper movement.

9. The method of claim 5, further comprising:
    performing a vehicle control operation based on the first depth map, said vehicle control operation being one of a direction control operation, a braking control operation or a speed control operation.

10. The method of claim 1 wherein operating the processor or circuit to control the single wiper to perform the first wiper sweep includes:
    controlling the single wiper to concurrently sweep across the first surface in front of the first camera and the second surface in front of the second camera.

11. The method of claim 10, wherein the first and second surfaces are different portions of a vehicle windshield, the second surface being located further away from a pivot point of said single wiper than the first surface.

12. The method of claim 11, wherein said second camera is positioned closer to a top of the windshield than said first camera.

13. The method of claim 1, further comprising:
    controlling a second pair of cameras including a third camera and a fourth camera to initiate capture of third and fourth images, respectively, after the single wiper sweeps a third surface in front of the third camera.

14. The method of claim 13, further comprising:
    generating a second depth map from the third and fourth images.

15. A system comprising:
a first camera;
a second camera;
a single wiper; and
a processor configured to:
control the single wiper to perform a first wiper sweep, said single wiper passing over a first surface in front of the first camera and a second surface in front of the second camera at the same time while said the single wiper moves during said first wiper sweep;
control the first and second cameras to capture images at the same time, controlling the first and second cameras to capture images at the same time including controlling the first camera to capture a first image and controlling the second camera to capture a second image while the first camera captures the first image, said first and second images being captured while said first wiper sweep is ongoing, said first image being captured after the single wiper sweeps the first surface in front of the first camera while the single wiper is moving; and
generate a first depth map from at least the first image captured by the first camera and the second image captured by the second camera.

16. The system of claim 15,
wherein said first and second cameras are mounted along the path of the single wiper such that the single wiper passes over the first and second surfaces at the same time.

17. The system of claim 15,
wherein the single wiper is a straight wiper; and
wherein said first and second cameras are positioned in a line with which said single wiper is aligned during a portion of the first wiper sweep.

18. The system of claim 15,
wherein the first and second cameras are spaced apart by a first distance; and
wherein the single wiper has a width which is less than said first distance and a length which is longer than said first distance.

19. The system of claim 15,
wherein said first surface is a first part of a windshield, the first part being located in front of an aperture of the first camera, said single wiper being clear of said aperture of the first camera at the time said first image is captured; and
wherein said second surface is a second part of the windshield, the second part being located in front of an aperture of the second camera.

20. The system of claim 19,
wherein controlling the first camera to capture a first image and controlling the second camera to capture a second image are performed as part of a step of controlling a plurality of cameras to capture images in a synchronized manner based on movement of said single wiper, said first and second cameras being part of said plurality of cameras.

21. The system of claim 20, further comprising:
a wiper position sensor; and
wherein controlling the first camera to capture the first image and controlling the second camera to capture the second image is performed in response to detection by the wiper position sensor that the single wiper has passed over the first surface.

22. The system of claim 21, wherein said first and second images include at least one image captured immediately after the single wiper passes in front of said first camera and prior to the single wiper changing a direction of wiper movement.

23. The system of claim 19, wherein the processor is further configured to:
perform a vehicle control operation based on the first depth map, said vehicle control operation being one of a direction control operation, a braking control operation or a speed control operation.

24. The system of claim 15, wherein the processor is configured to:
control the single wiper to concurrently sweep across the first surface in front of the first camera and the second surface in front of the second camera, as part of being configured to control the single wiper to perform a first wiper sweep.

25. The system of claim 24, wherein the first surface and second surface are different parts of a vehicle windshield, the second surface being located further away from a pivot point of said single wiper than the first surface.

26. The system of claim 25, wherein said second camera is positioned closer to a top of the windshield than said first camera.

27. The system of claim 16, wherein the processor is further configured to:
control a second pair of cameras including a third camera and a fourth camera to initiate capture of third and fourth images, respectively, after the single wiper sweeps a third surface in front of the third camera.

28. The system of claim 27, wherein the processor is further configured to:
generate a second depth map from the third and fourth images.

* * * * *